(12) United States Patent
Pacala et al.

(10) Patent No.: US 12,487,362 B2
(45) Date of Patent: Dec. 2, 2025

(54) CONFIGURABLE MEMORY BLOCKS FOR LIDAR MEASUREMENTS

(71) Applicant: Ouster, Inc., San Francisco, CA (US)

(72) Inventors: Angus Pacala, San Francisco, CA (US); Yan Zhao, San Francisco, CA (US); Boyi Ma, San Francisco, CA (US); Marvin Shu, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 987 days.

(21) Appl. No.: 17/451,612

(22) Filed: Oct. 20, 2021

(65) Prior Publication Data

US 2022/0043156 A1 Feb. 10, 2022

Related U.S. Application Data

(63) Continuation of application No. PCT/US2020/055343, filed on Oct. 13, 2020.
(Continued)

(51) Int. Cl.
*G01S 17/93* (2020.01)
*G01S 7/481* (2006.01)
(Continued)

(52) U.S. Cl.
CPC ............ *G01S 17/93* (2013.01); *G01S 7/4817* (2013.01); *G01S 17/36* (2013.01); *G01S 17/42* (2013.01);
(Continued)

(58) Field of Classification Search
CPC .......... G01S 17/93; G01S 17/36; G01S 17/42; G01S 7/4817; G06F 13/1673; G06F 13/1689
See application file for complete search history.

(56) References Cited

U.S. PATENT DOCUMENTS 4,891,521 A 1/1990 Danos
5,208,642 A 5/1993 Narutaki
(Continued)

FOREIGN PATENT DOCUMENTS

CN 102141772 8/2011
CN 104363021 A 2/2015
(Continued)

OTHER PUBLICATIONS

PCT/US2020/055343, International Search Report and Written Opinion, Mailed on Feb. 24, 2021, 13 pages.
(Continued)

*Primary Examiner* — Henry Tsai
*Assistant Examiner* — John B Roche
(74) *Attorney, Agent, or Firm* — Kilpatrick Townsend & Stockton LLP

(57) ABSTRACT

An optical measurement system may include a plurality of light sources and a plurality of photosensors, where the photosensors are configured to receive photons from the light sources that are reflected off objects in the surrounding environment. Photons may be stored in memory blocks corresponding to the photosensors to form histograms of the receive photons. A select circuit may be used to share memory blocks between photosensors, such that a plurality of photosensors may write to a single memory block, or a single photosensor may write to a plurality of memory blocks. Sampling clock cycles for the photosensors may be adjusted relative to the clock cycles for the memory blocks based on the select circuit output.

19 Claims, 23 Drawing Sheets

Related U.S. Application Data

(60) Provisional application No. 62/913,602, filed on Oct. 10, 2019.

(51) Int. Cl.
*G01S 17/36* (2006.01)
*G01S 17/42* (2006.01)
*G06F 13/16* (2006.01)

(52) U.S. Cl.
CPC ...... *G06F 13/1673* (2013.01); *G06F 13/1689* (2013.01)

(56) References Cited

U.S. PATENT DOCUMENTS

| | | | |
|---|---|---|---|
| 10,474,115 B2 | 11/2019 | Decker et al. | |
| 10,877,532 B2 | 12/2020 | Dimen | |
| 11,520,050 B2 | 12/2022 | Iguchi et al. | |
| 2006/0161698 A1* | 7/2006 | Shen | G06F 13/4018 710/52 |
| 2006/0187226 A1* | 8/2006 | Bruno | G06F 13/1689 345/534 |
| 2012/0249999 A1* | 10/2012 | Stettner | G01C 21/20 356/5.01 |
| 2013/0228697 A1* | 9/2013 | Soh | H04N 25/30 250/394 |
| 2016/0033644 A1* | 2/2016 | Moore | G01S 7/4813 356/5.01 |
| 2017/0016981 A1 | 1/2017 | Hinderling et al. | |
| 2018/0091442 A1* | 3/2018 | Chen | H04L 49/101 |
| 2018/0259645 A1* | 9/2018 | Shu | G01S 7/497 |
| 2018/0299552 A1 | 10/2018 | Shu | |
| 2019/0102836 A1* | 4/2019 | Wales | G06Q 40/03 |
| 2019/0214075 A1* | 7/2019 | Chen | G06F 3/0673 |
| 2020/0092540 A1 | 3/2020 | Tsai | |
| 2020/0341144 A1 | 10/2020 | Pacala et al. | |

FOREIGN PATENT DOCUMENTS

| | | |
|---|---|---|
| CN | 105573192 A | 5/2016 |
| CN | 106461731 A | 2/2017 |
| CN | 109302192 A | 2/2019 |
| EP | 3382421 A1 | 10/2018 |
| WO | 2018221048 A1 | 12/2018 |

OTHER PUBLICATIONS

PCT/US2020/055343, "Invitation to Pay Additional Fees and, Where Applicable, Protest Fee", Dec. 23, 2020, 2 pages.
CN202080082953.0, "Office Action", Sep. 27, 2024, 27 pages.
EP20874076.1, "Extended European Search Report", Oct. 13, 2023, 9 pages.

* cited by examiner

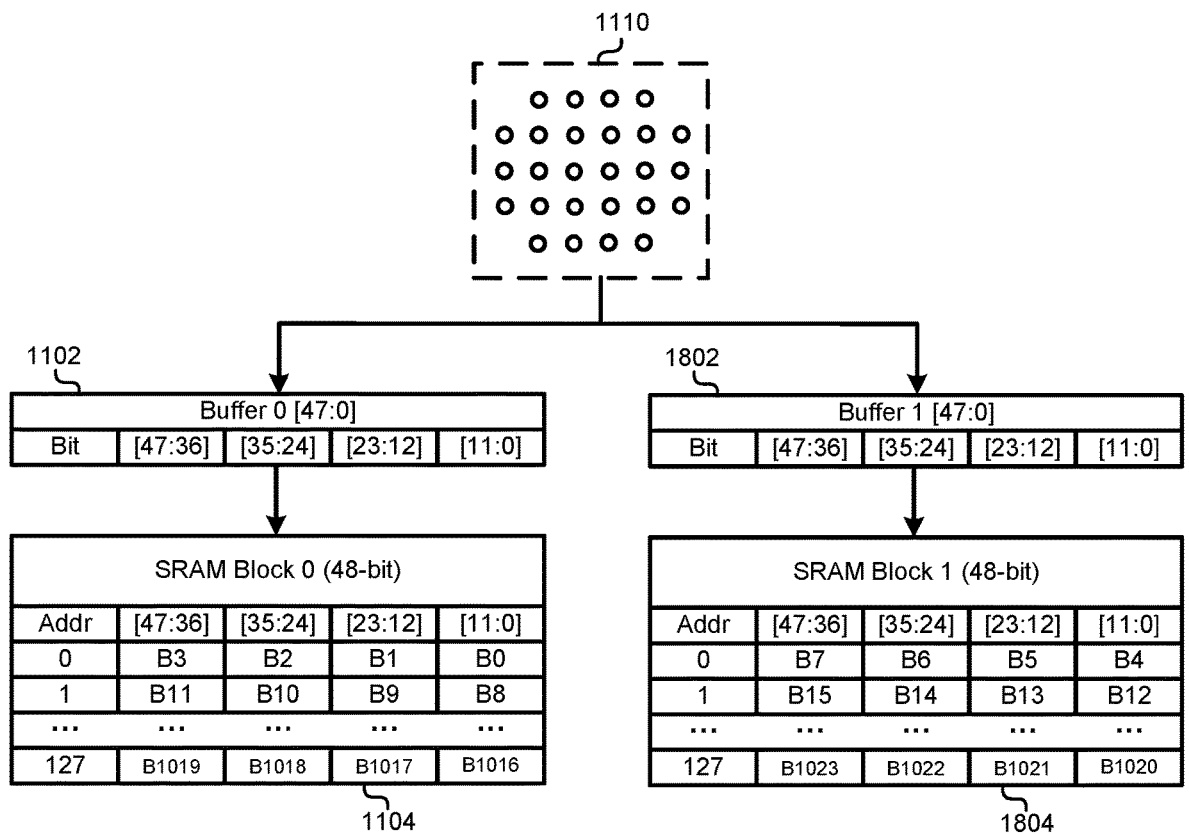
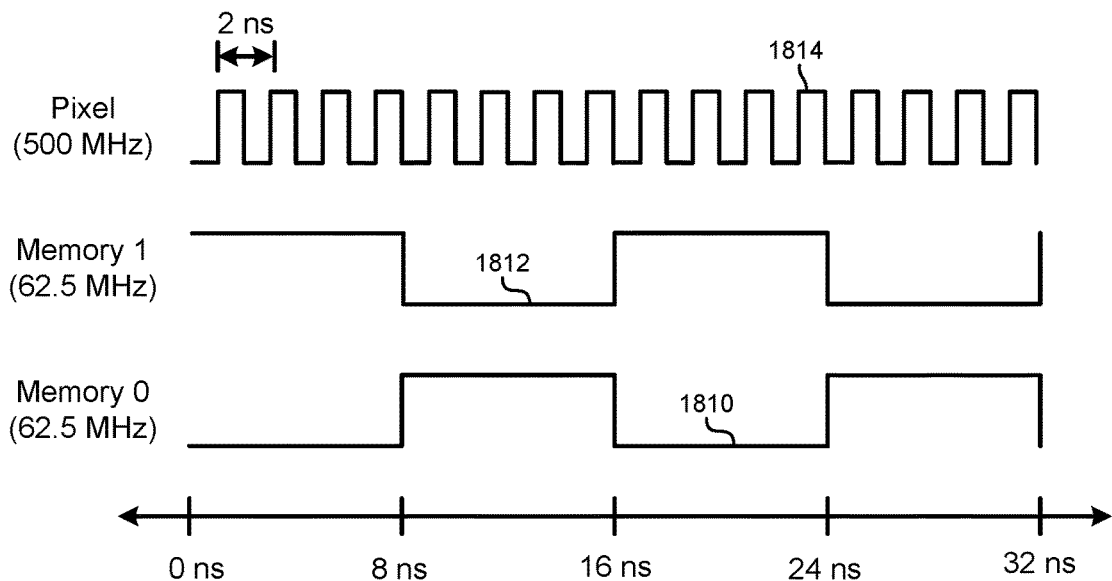
FIG. 18

CONFIGURABLE MEMORY BLOCKS FOR LIDAR MEASUREMENTS

CROSS-REFERENCES TO RELATED APPLICATIONS

This application is a continuation of International Application No. PCT/US2020/055343 filed Oct. 13, 2020, entitled "CONFIGURABLE MEMORY BLOCKS FOR LIDAR MEASUREMENTS" which claims the benefit of U.S. Provisional Patent Application No. 62/913,602, filed on Oct. 10, 2019, entitled "CONFIGURABLE MEMORY BLOCKS FOR LIDAR MEASUREMENTS." The disclosures of these applications are incorporated herein by reference.

BACKGROUND

Light Detection And Ranging (LIDAR) systems are used for object detection and ranging, e.g., for vehicles such as cars, trucks, boats, etc. LIDAR systems also have uses in mobile applications (e.g., for face recognition), home entertainment (e.g., to capture gesture capture for video game input), and augmented reality. A LIDAR system measures the distance to an object by irradiating a landscape with pulses from a laser, and then measuring the time for photons to travel to an object and return after reflection, as measured by a receiver of the LIDAR system. A detected signal is analyzed to detect the presence of reflected signal pulses among background light. A distance to an object can be determined based on a time-of-flight from transmission of a pulse to reception of a corresponding reflected pulse.

It can be difficult to provide robust distance accuracy down to a few centimeters in all conditions, particularly at an economical cost for the LIDAR system. Promising new detector technologies, like single photon avalanche diodes (SPADs), are attractive but have significant drawbacks when used to measure time-of-flight and other signal characteristics due to their limited dynamic range, particularly over a broad range of ambient conditions and target distances. Additionally, because of their sensitivity to even a small number of photons, SPADs can be very susceptible to ambient levels of background noise light.

LIDAR systems generally require memory blocks for each photosensor. Therefore, increasing the number of photosensors in a LIDAR system also means increasing the number of memory blocks required in a corresponding integrated circuit. Memory blocks tend to require more surface real estate in an integrated circuit than other LIDAR data path components, such as arithmetic logic units (ALUs), threshold circuitry, hold circuitry, etc. Memory blocks also tend to become a bottleneck in the data path in terms of timing requirements, as memory blocks are often clocked slower than their corresponding photosensors and ALUs. Therefore, LIDAR systems would greatly benefit from more flexible memory systems that can decrease the required number of memory blocks and/or increase the clock frequency of the data path in comparison to the memory blocks.

SUMMARY

In some embodiments, an optical measurement system may include a plurality of light sources configured to transmit one or more pulse trains over one or more time intervals as part of an optical measurement. Each of the one or more time intervals may include one of the one or more pulse trains, and each of the one or more time intervals may be subdivided into a plurality of time bins. The system may also include a plurality of photosensors, where each of the plurality of photosensors may be configured to detect photons from a corresponding one of the plurality of light sources. The system may additionally include a memory block including a plurality of registers configured to store accumulated photon counts received by one or more photosensors in the plurality of photosensors during the one or more time intervals. Each of the plurality of registers may be associated with a corresponding one of the plurality of time bins. The system may further include a select circuit configured to selectively receive accumulated photon counts from active photosensors in the plurality of photosensors received during the one or more time intervals; and select the one or more photosensors in the plurality of photosensors for which the accumulated photon counts are stored in the memory block.

In any embodiments, any or all of the following features may be implemented in any combination and without limitation. The system may also include a buffer coupled to the select circuit and the memory block and configured to receive the accumulated photon counts from the one or more photosensors. The buffer may be configured to receive the accumulated photon counts incrementally from the one or more photosensors as they are provided by the one or more photosensors. The buffer may be configured to provide the accumulated photon counts to the memory block when the buffer is filled. The buffer may be divided into a plurality of sections. At least a portion of the plurality of sections may be populated with accumulated photon counts from different photosensors in the one or more photosensors during a time bin. Each of the plurality of sections may be populated during a same one of the plurality of time bins. Each of the plurality of sections may be populated with accumulated photon counts from a same photosensor in the one or more photosensors. Each of the plurality of sections may be populated during different ones of the plurality of time bins. A bit-width of the memory block may be the same as a bit-width of the buffer. Entries in a row of the plurality of registers in the memory block may be populated together in a single write operation. At least one of the plurality of photosensors may be coupled to a plurality of select circuits. At least one of the plurality of photosensors may be coupled to a plurality of memory blocks.

In some embodiments, a method of using an optical measurement system may include transmitting one or more pulse trains from a plurality of light sources over one or more first time intervals as part of an optical measurement. Each of the one or more first time intervals may include one of the one or more pulse trains. Each of the one or more time intervals may be subdivided into a plurality of time bins. The method may also include detecting photons from the one or more pulse trains using a plurality of photosensors, selecting one or more photosensors in the plurality of photosensors to share a memory block, and accumulating photon counts from the one or more photosensors received during the one or more time intervals into the memory block. The memory block may include a plurality of registers. Each of the plurality of registers may be associated with a corresponding one of the plurality of time bins and a corresponding one of one or more photosensors to represent at least one histogram. Batches of the photon counts may be written together to the memory block from more than one of the one or more photosensors or more than one of the plurality of time bins.

In any embodiments, any or all of the following features may be implemented in any combination and without limitation. Selecting the one or more photosensors in the plurality of photosensors to share the memory block may include receiving a signal from an on-chip processor. Selecting the one or more photosensors in the plurality of photosensors to share the memory block may include receiving a signal from an off-chip processor as the optical measurement system is operating. The method may also include changing a clock signal associated with the one or more photosensors based on a number of photosensors in the one or more photosensors. Increasing the number of photosensors in the one or more photosensors may decrease a frequency of the clock signal associated with the one or more photosensors. Decreasing the number of photosensors in the one or more photosensors may increase a frequency of the clock signal associated with the one or more photosensors. The method may also include causing one or more memory blocks to remain idle, where the one or more memory blocks may be associated with the one or more photosensors. The method may additionally include receiving a select signal that adds or removes photosensors from the one or more photosensors for which photon counts are accumulated in the memory block, and changing a clock signal associated with the one or more photosensors. The clock signal associated with the one or more photosensors may be phase-aligned with a clock signal associated with the memory block. Accumulating the photon counts from the one or more photosensors received during the one or more time intervals may include adding photon counts received from the one or more photosensors to existing values in the memory block.

In some embodiments, an optical measurement system may include a light source configured to transmit one or more pulse trains over one or more time intervals as part of an optical measurement. Each of the one or more time intervals may include one of the one or more pulse trains, and each of the one or more time intervals may be subdivided into a plurality of time bins. The system may also include a photosensor configured to detect photons from the light source. The system may additionally include one or more memory blocks. Each of the one or more memory blocks may include a plurality of registers configured to store accumulated photon counts from the photosensor. Each of the plurality of registers may be associated with a corresponding one of the plurality of time bins to represent a histogram. The system may further include a select circuit configured to receive accumulated photon counts from the photosensor during the one or more time intervals; and select the one or more memory blocks from a plurality of memory blocks into which the accumulated photon counts for the photosensor are stored.

In any embodiments, any or all of the following features may be implemented in any combination and without limitation. The system may also include one or more buffers coupled to the select circuit and the one or more memory blocks and configured to receive the accumulated photon counts from the photosensor. The one or more buffers may be configured to receive the accumulated photon counts incrementally from the photosensor as they are provided by the photosensor. The one or more buffers may be configured to provide the accumulated photon counts to the one or more memory blocks when each of the one or more buffers are filled. Each of the one or more buffers may be divided into a plurality of sections. Each of the plurality of sections may be populated with accumulated photon counts from different time bins in the plurality of time bins. Each of the plurality of sections may be populated with accumulated photon counts from the photosensor. A bit-width of the memory block may be the same as a bit-width of the buffer. The select circuit may include a plurality of multiplexers that route outputs from the photosensor to the one or more memory blocks. The system may also include a clock multiplier that increases a frequency of a clock used for the photosensor.

In some embodiments, a method of using an optical measurement system may include transmitting one or more pulse trains from a light source over one or more first time intervals as part of an optical measurement. Each of the one or more first time intervals may include one of the one or more pulse trains. Each of the one or more time intervals may be subdivided into a plurality of time bins. The method may also include detecting photons from the one or more pulse trains using a photosensor, selecting one or more memory blocks from a plurality of memory blocks to store accumulated photon counts from the photosensor, and accumulating photon counts from the photosensor received during the one or more time intervals into the one or more memory blocks. Each of the one or more memory blocks may include a plurality of registers. Each of the plurality of registers may be associated with a corresponding one of the plurality of time bins for the photosensors to represent a histogram.

In any embodiments, any or all of the following features may be implemented in any combination and without limitation. Selecting the one or more memory blocks from the plurality of memory blocks may include receiving a signal from an on-chip processor. Selecting the one or more memory blocks from the plurality of memory blocks may include receiving a signal from an off-chip processor as the optical measurement system is operating. The method may additionally include changing a clock signal associated with the photosensor based on a number of memory blocks in the one or more memory blocks. Increasing the number of memory blocks in the one or more memory blocks may increase a frequency of the clock signal associated with the photosensor. Decreasing the number of memory blocks in the one or more memory blocks may decrease a frequency of the clock signal associated with the photosensor. The method may further include causing one or more photosensors to remain idle, where the one or more photosensors may be associated with the one or more memory blocks. The method may also include receiving a select signal that adds or removes memory blocks from the one or more memory blocks that accumulate photon counts from the photosensor, and changing a clock signal associated with the photosensor. Clock signals associated with the one or more memory blocks may be phase-shifted 90° relative to each other. Clock signals associated with the one or more memory blocks may be phase-shifted 180° relative to each other.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 18 illustrates how a single pixel may write to multiple buffers and multiple memory blocks, according to some embodiments.

TERMS

Figure 1B:
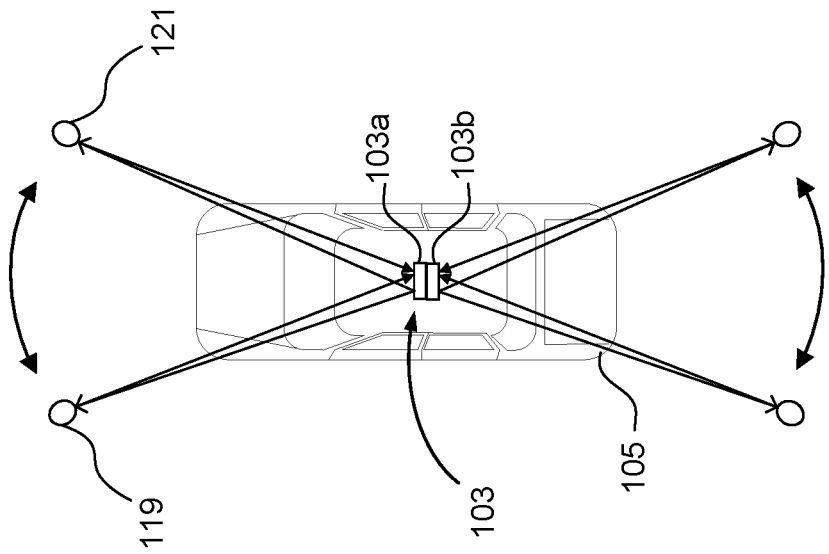
FIGS. 1A and 1B show automotive light ranging devices, also referred to herein as LIDAR systems, according to some embodiments.

The term "ranging," particularly when used in the context of methods and devices for measuring an environment or assisting with vehicle operations, may refer to determining a distance or a distance vector from one location or position to another location or position. "Light ranging" may refer to a type of ranging method that makes use of electromagnetic waves to perform ranging methods or functions. Accordingly, a "light ranging device" may refer to a device for performing light ranging methods or functions. "Lidar" or "LIDAR" may refer to a type of light ranging method that measures a distance to a target by illuminating the target with a pulsed laser light, and thereafter measure the reflected pulses with a sensor. Accordingly, a "lidar device" or "lidar system" may refer to a type of light ranging device for performing lidar methods or functions. A "light ranging system" may refer to a system comprising at least one light ranging device, e.g., a lidar device. The system may further comprise one or more other devices or components in various arrangements.

A "pulse train" may refer to one or more pulses that are transmitted together. The emission and detection of a pulse train may be referred to as a "shot." A shot can occur over a "detection time interval" (or "detection interval").

A "measurement" may include N multiple pulse trains that are emitted and detected over N shots, each lasting a detection time interval. An entire measurement can be over a measurement time interval (or just "measurement interval"), which may equal the N detection interval of a measurement or be longer, e.g., when pauses occur between detection intervals.

A "photosensor" or "photosensitive element" can convert light into an electrical signal. A photosensor may include a plurality of "photodetectors," e.g., single-photon avalanche diodes (SPADs). A photosensor can correspond to a particular pixel of resolution in a ranging measurement.

A "histogram" may refer to any data structure representing a series of values over time, as discretized over time bins. A histogram can have a value assigned to each time bin. For example, a histogram can store a counter of a number of photodetectors that fired during a particular time bin in each of one or more detection intervals. As another example, a histogram can correspond to the digitization of an analog signal at different times. A histogram can include signal (e.g., pulses) and noise. Thus, a histogram can be considered a combination of signal and noise as a photon time series or photon flux. A raw/digitized histogram (or accumulated photon time series) can contain the signal and the noise as digitized in memory without filtering. A "filtered histogram" may refer to the output after the raw histogram is passed through a filter.

A "memory block" may refer to a single instance of a memory unit on an integrated circuit implementing the optical measurement system. This terminology may be used to distinguish individual memory blocks from each other in the optical measurement system. A memory block may have a width corresponding to the size of a buffer that is used to read/write the memory block. A memory block may also have a length corresponding to a number of rows in the memory block. Memory blocks may represent histograms of values received by the photosensors. A memory block may be paired on a one-to-one basis with photosensors and arithmetic logic circuits to form histogram data paths for each photosensor. As described below, memory blocks may also be shared amongst photosensors and/or multiple photosensors may share single memory blocks between histogram data paths.

An emitted signal/pulse may refer to the "nominal," "ideal," or "template" pulse or pulse train that is not distorted. A reflected signal/pulse may refer to the reflected laser pulse from an object and may be distorted. A digitized signal/pulse (or raw signal) may refer to the digitized result from the detection of one or more pulse trains of a detection interval as stored in memory, and thus may be equivalent to a portion of a histogram. A detected signal/pulse may refer to the location in memory that the signal was detected. A detected pulse train may refer to the actual pulse train found by a matched filter. An anticipated signal profile may refer to a shape of a digitized signal resulting from a particular emitted signal that has a particular distortion in the reflected signal.

DETAILED DESCRIPTION

The present disclosure relates generally to the field of object detection and ranging, and more particularly to the use of time-of-flight optical receiver systems for applications such as real-time three-dimensional mapping and object detection, tracking, and/or classification. Various improvements can be realized with various embodiments of the present invention. Such improvements can be increased spatial resolution, increased temporal resolution, a decrease in memory size and requirements, and/or faster clocking of data path components relative to associated memory blocks.

An optical measurement system may include an array of photosensors, each of which may be part of a histogram data path that can be used to accumulate photon count to form a histogram of photon arrival times. The embodiments described below allow the connections between the photosensors and the memory blocks storing the histogram data to be selectively configured, such that multiple photosensors can write to a single memory block, and/or a single photosensor may write to multiple memory blocks. Sections below introduce an illustrative automotive LIDAR system, followed by descriptions of example techniques to detect signals by a light ranging system, and then different embodiments are described in more detail.

I. Illustrative Automotive Lidar System

Figure 1A:
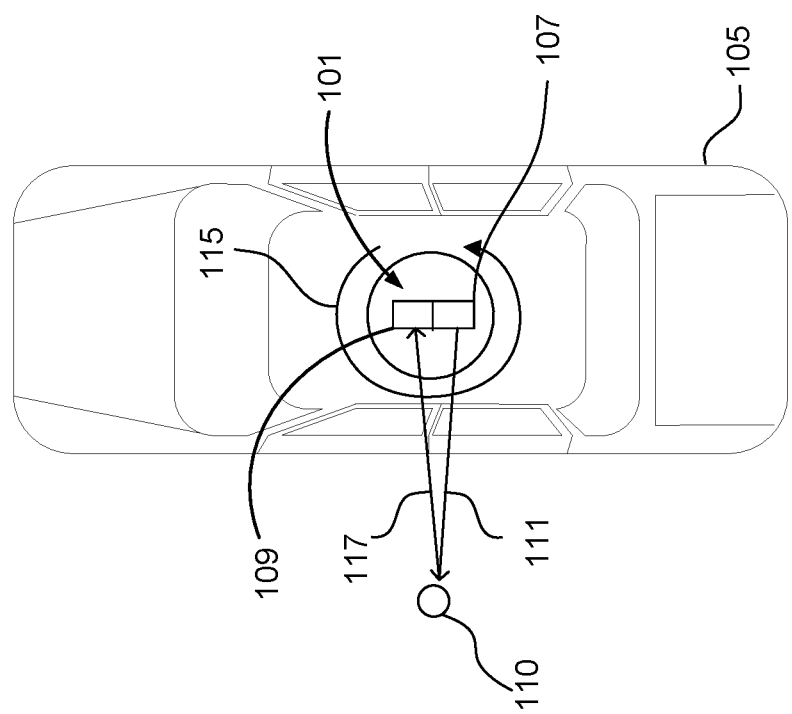

FIGS. 1A-1B show automotive light ranging devices, also referred to herein as LIDAR systems, according to some embodiments. The automotive application for the LIDAR systems is chosen here merely for the sake of illustration and the sensors described herein may be employed in other types of vehicles, e.g., boats, aircraft, trains, etc., as well as in a variety of other applications where 3D depth images are useful, such as medical imaging, mobile phones, augmented reality, geodesy, geomatics, archaeology, geography, geology, geomorphology, seismology, forestry, atmospheric physics, laser guidance, airborne laser swath mapping (ALSM), and laser altimetry. According to some embodiments, a LIDAR system, e.g., scanning LIDAR system 101 and/or solid state LIDAR system 103, can be mounted on the roof of a vehicle 105 as shown in FIGS. 1A and 1B.

The scanning LIDAR system 101 shown in FIG. 1A can employ a scanning architecture, where the orientation of the LIDAR light source 107 and/or detector circuitry 109 can be scanned around one or more fields of view 110 within an external field or scene that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the LIDAR system 101, can be scanned, e.g., rotated, to illuminate a scene around the vehicle. In some embodiments, the scanning, represented by rotation arrow 115, can be implemented by mechanical means, e.g., by mounting the light emitters to a rotating column or platform. In some embodiments, the scanning can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, and the like. In some embodiments, the scanning can be effectuated through non-mechanical means, e.g., by using electronic signals to steer one or more optical phased arrays.

For a stationary architecture, like solid state LIDAR system 103 shown in FIG. 1B, one or more solid state LIDAR subsystems (e.g., 103a and 103b) can be mounted to the vehicle 105. Each solid state LIDAR unit can face a different direction (possibly with partially and/or non-overlapping fields of views between units) so as to capture a composite field of view that is larger than each unit is capable of capturing on its own.

In either the scanning or stationary architectures, objects within the scene can reflect portions of the light pulses that are emitted from the LIDAR light sources. One or more reflected portions then travel back to the LIDAR system and can be detected by the detector circuitry. For example, reflected portion 117 can be detected by detector circuitry 109. The detector circuitry can be disposed in the same housing as the emitters. Aspects of the scanning system and stationary system are not mutually exclusive and thus can be used in combination. For example, the individual LIDAR subsystems 103a and 103b in FIG. 1B can employ steerable emitters such as an optical phased array or whole the composite unit may rotate through mechanical means thereby scanning the entire scene in front of the LIDAR system, e.g., from field of view 119 to field of view 121.

Figure 2:
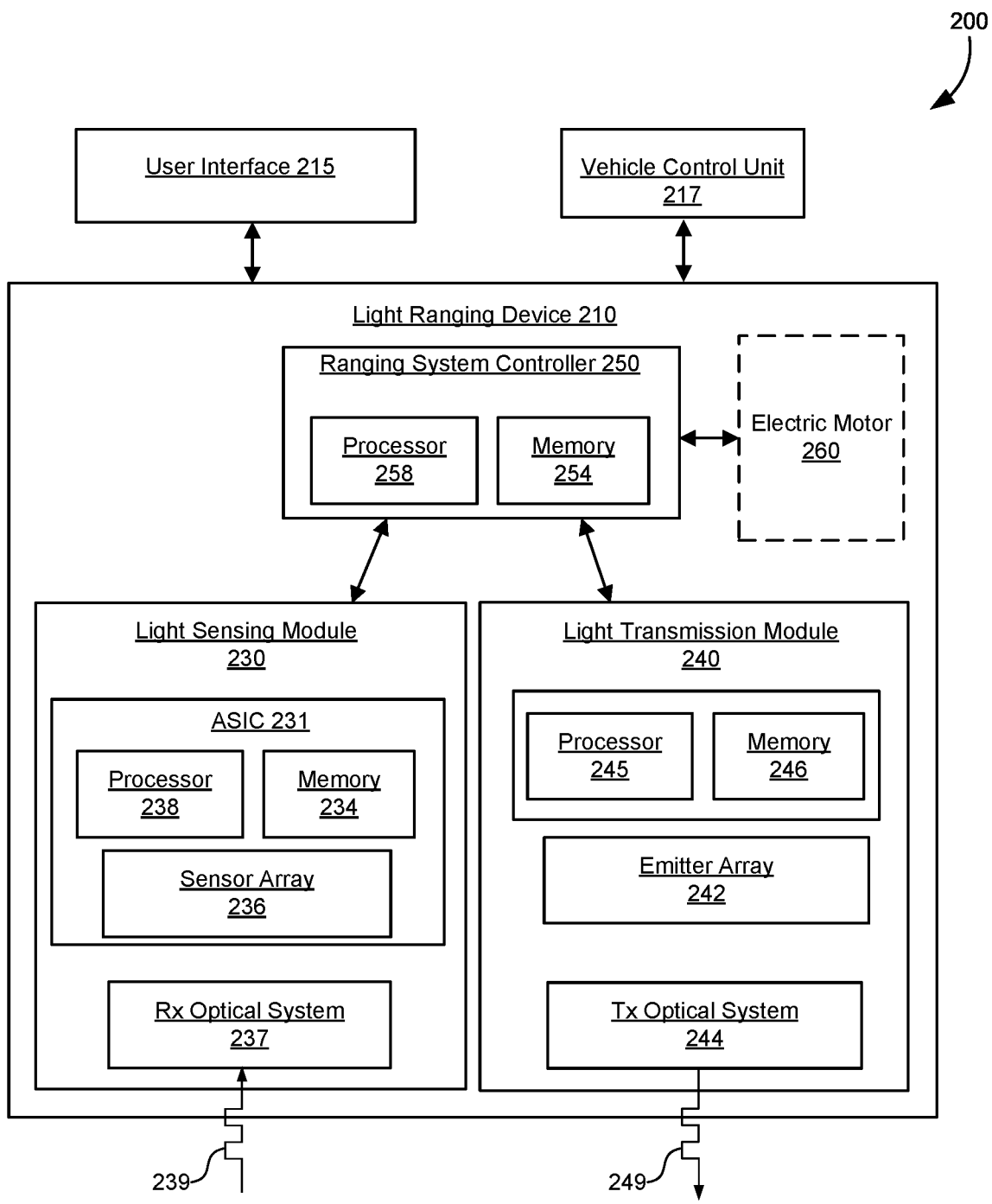
FIG. 2 shows a block diagram of an exemplary LIDAR device for implementing various embodiments.

FIG. 2 illustrates a more detailed block diagram of a rotating LIDAR system 200 according to some embodiments. More specifically, FIG. 2 optionally illustrates a rotating LIDAR system that can employ a rotary actuator on a rotating circuit board, which can receives power and data (as well as transmit) from a stationary circuit board.

LIDAR system 200 can interact with one or more instantiations of user interface 215. The different instantiations of user interface 215 can vary and may include, e.g., a computer system with a monitor, keyboard, mouse, CPU and memory; a touch-screen in an automobile; a handheld device with a touch-screen; or any other appropriate user interface. The user interface 215 may be local to the object upon which the LIDAR system 200 is mounted but can also be a remotely operated system. For example, commands and data to/from the LIDAR system 200 can be routed through a cellular network (LTE, etc.), a personal area network (Bluetooth, Zigbee, etc.), a local area network (WiFi, IR, etc.), or a wide area network such as the Internet.

The user interface 215 of hardware and software can present the LIDAR data from the device to the user but can also allow a user to control the LIDAR system 200 with one or more commands. Example commands can include commands that activate or deactivate the LIDAR system, specify photo-detector exposure level, bias, sampling duration and other operational parameters (e.g., emitted pulse patterns and signal processing), specify light emitters parameters such as brightness. In addition, commands can allow the user to select the method for displaying results. The user interface can display LIDAR system results which can include, e.g., a single frame snapshot image, a constantly updated video image, and/or a display of other light measurements for some or all pixels. In some embodiments, user interface 215 can track distances (proximity) of objects from the vehicle, and potentially provide alerts to a driver or provide such tracking information for analytics of a driver's performance.

In some embodiments, the LIDAR system can communicate with a vehicle control unit 217 and one or more parameters associated with control of a vehicle can be modified based on the received LIDAR data. For example, in a fully autonomous vehicle, the LIDAR system can provide a real time 3D image of the environment surrounding the car to aid in navigation. In other cases, the LIDAR system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When a vehicle control unit 217 is communicably coupled to light ranging device 210, alerts can be provided to a driver or tracking of a proximity of an object can be tracked.

The LIDAR system 200 shown in FIG. 2 includes the light ranging device 210. The light ranging device 210 includes a ranging system controller 250, a light transmission (Tx) module 240 and a light sensing (Rx) module 230. Ranging data can be generated by the light ranging device by transmitting one or more light pulses 249 from the light transmission module 240 to objects in a field of view surrounding the light ranging device. Reflected portions 239 of the transmitted light are then detected by the light sensing module 230 after some delay time. Based on the delay time, the distance to the reflecting surface can be determined. Other ranging methods can be employed as well, e.g. continuous wave, Doppler, and the like.

The Tx module 240 includes an emitter array 242, which can be a one-dimensional or two-dimensional array of emitters, and a Tx optical system 244, which when taken together can form an array of micro-optic emitter channels. Emitter array 242 or the individual emitters are examples of laser sources. The Tx module 240 further includes processor 245 and memory 246. In some embodiments, a pulse coding technique can be used, e.g., Barker codes and the like. In such cases, memory 246 can store pulse-codes that indicate when light should be transmitted. In one embodiment the pulse-codes are stored as a sequence of integers stored in memory.

The Rx module 230 can include sensor array 236, which can be, e.g., a one-dimensional or two-dimensional array of photosensors. Each photosensor or photosensitive element (also referred to as a sensor) can include a collection of photodetectors, e.g., APDs or the like, or a sensor can be a single photon detector (e.g., an SPAD). Like the Tx module 240, Rx module 230 includes an Rx optical system 237. The Rx optical system 237 and sensor array 236 taken together can form an array of micro-optic receiver channels. Each micro-optic receiver channel measures light that corresponds to an image pixel in a distinct field of view of the surrounding volume. Each sensor (e.g., a collection of SPADs) of sensor array 236 can correspond to a particular emitter of emitter array 242, e.g., as a result of a geometrical configuration of light sensing module 230 and light transmission module 240.

In one embodiment, the sensor array 236 of the Rx module 230 is fabricated as part of a monolithic device on a single substrate (using, e.g., CMOS technology) that includes both an array of photon detectors and an ASIC 231 for signal processing the raw histograms from the individual photon detectors (or groups of detectors) in the array. As an example of signal processing, for each photon detector or grouping of photon detectors, memory 234 (e.g., SRAM) of the ASIC 231 can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). The ASIC 231 can implement matched filters and peak detection processing to identify return signals in time. In addition, the ASIC 231 can accomplish certain signal processing techniques (e.g., by processor 238), such as multi-profile matched filtering to help recover a photon time series that is less susceptible to pulse shape distortion that can occur due to SPAD saturation and quenching. In some embodiments, all or parts of such filtering can be performed by processor 258, which may be embodied in an FPGA.

In some embodiments, the Rx optical system 237 can also be part of the same monolithic structure as the ASIC, with separate substrate layers for each receiver channel layer. For example, an aperture layer, collimating lens layer, an optical filter layer and a photo-detector layer can be stacked and bonded at the wafer level before dicing. The aperture layer can be formed by laying a non-transparent substrate on top of a transparent substrate or by coating a transparent substrate with an opaque film. In yet other embodiments, one or more components of the Rx module 230 may be external to the monolithic structure. For example, the aperture layer may be implemented as a separate metal sheet with pin-holes.

In some embodiments, the photon time series output from the ASIC are sent to the ranging system controller 250 for further processing, e.g., the data can be encoded by one or more encoders of the ranging system controller 250 and then sent as data packets to user interface 215. The ranging system controller 250 can be realized in multiple ways including, e.g., by using a programmable logic device such an FPGA, as an ASIC or part of an ASIC, using a processor 258 with memory 254, and some combination of the above. The ranging system controller 250 can cooperate with a stationary base controller or operate independently of the base controller (via pre-programed instructions) to control the light sensing module 230 by sending commands that include start and stop light detection and adjust photo-detector parameters. Similarly, the ranging system controller 250 can control the light transmission module 240 by sending commands, or relaying commands from the base controller, that include start and stop light emission controls and controls that can adjust other light-emitter parameters (e.g., pulse codes). In some embodiments, the ranging system controller 250 has one or more wired interfaces or connectors for exchanging data with the light sensing module 230 and with the light transmission module 240. In other embodiments, the ranging system controller 250 communicates with the light sensing module 230 and light transmission module 240 over a wireless interconnect such as an optical communication link.

The electric motor 260 may be an optional component needed when system components, e.g., the Tx module 240 and or Rx module 230, need to rotate. The system controller 250 controls the electric motor 260 and can start rotation, stop rotation and vary the rotation speed.

II. Detection of Reflected Pulses

The photosensors can be arranged in a variety of ways for detecting reflected pulses. For example, the photosensors can be arranged in an array, and each photosensor can include an array of photodetectors (e.g., SPADs). Different patterns of pulses (pulse trains) transmitted during a detection interval are also described below.

A. Time-of-Flight Measurements and Detectors

Figure 3:
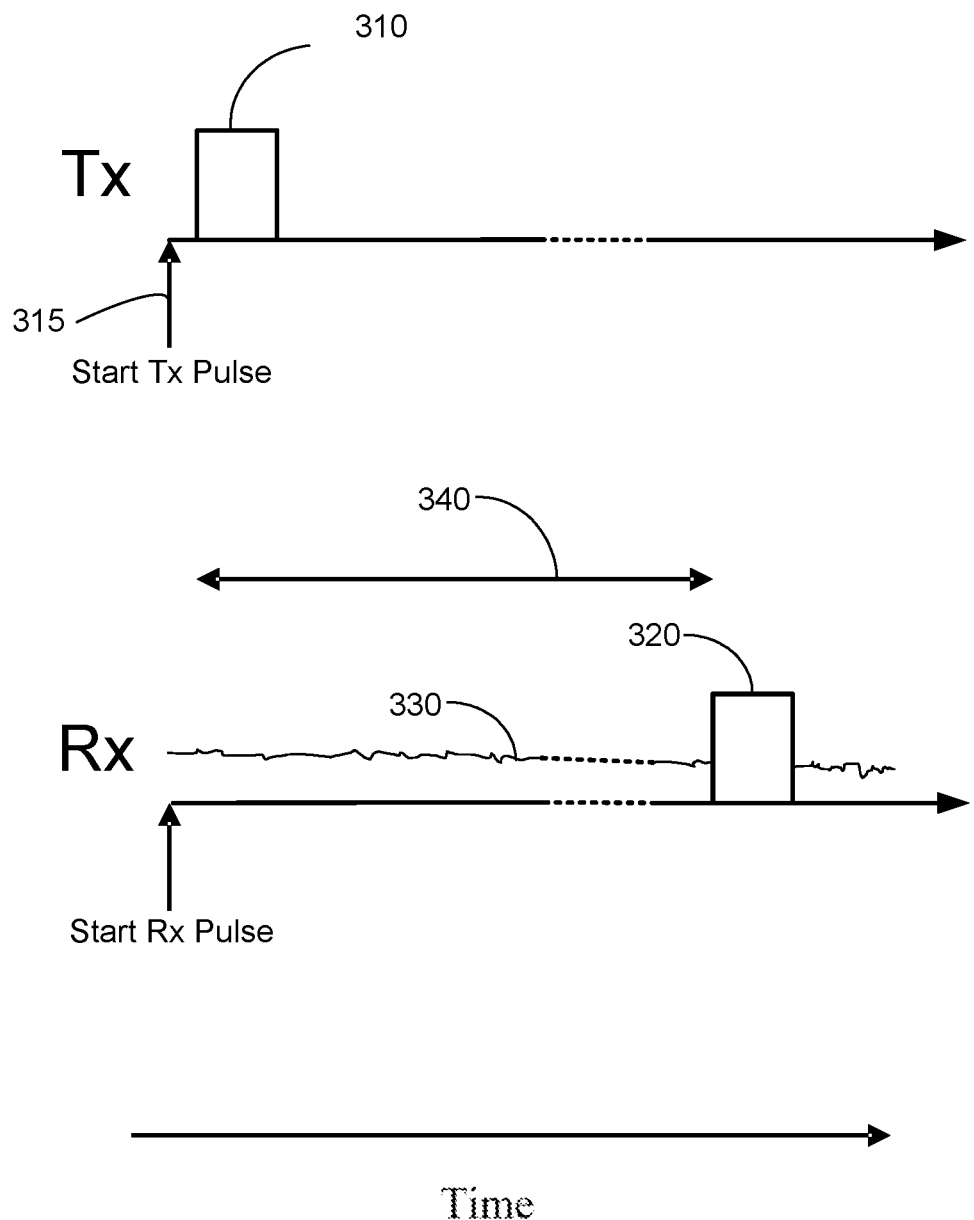
FIG. 3 illustrates the operation of a typical LIDAR system that may be improved by embodiments.

FIG. 3 illustrates the operation of a typical LIDAR system that may be improved by some embodiments. A laser generates a light pulse 310 of short duration. The horizontal axis represents time and the vertical axis represents power. An example laser pulse duration, characterized by the full-width half maximum (FWHM), is a few nanoseconds, with the peak power of a single emitter being around a few watts. Embodiments that use side emitter lasers or fiber lasers may have much higher peak powers, while embodiments with small diameter VCSELs could have peak powers in the tens of milliwatts to hundreds of milliwatts.

A start time 315 for the transmission of the pulse does not need to coincide with the leading edge of the pulse. As shown, the leading edge of light pulse 310 may be after the start time 315. One may want the leading edge to differ in situations where different patterns of pulses are transmitted at different times, e.g., for coded pulses.

An optical receiver system can start detecting received light at the same time as the laser is started, i.e., at the start time. In other embodiments, the optical receiver system can start at a later time, which is at a known time after the start time for the pulse. The optical receiver system detects background light 330 initially and after some time detects the laser pulse reflection 320. The optical receiver system can compare the detected light intensity against a threshold to identify the laser pulse reflection 320. The threshold can distinguish the background light 330 from light corresponding to the laser pulse reflection 320.

The time-of-flight 340 is the time difference between the pulse being sent and the pulse being received. The time difference can be measured by subtracting the transmission time of the pulse (e.g., as measured relative to the start time) from a received time of the laser pulse reflection 320 (e.g., also measured relative to the start time). The distance to the target can be determined as half the product of the time-of-flight and the speed of light. Pulses from the laser device reflect from objects in the scene at different times and the pixel array detects the pulses of radiation reflection.

B. Detection of Objects Using Array Lasers and Array of Photosensors

Figure 4:
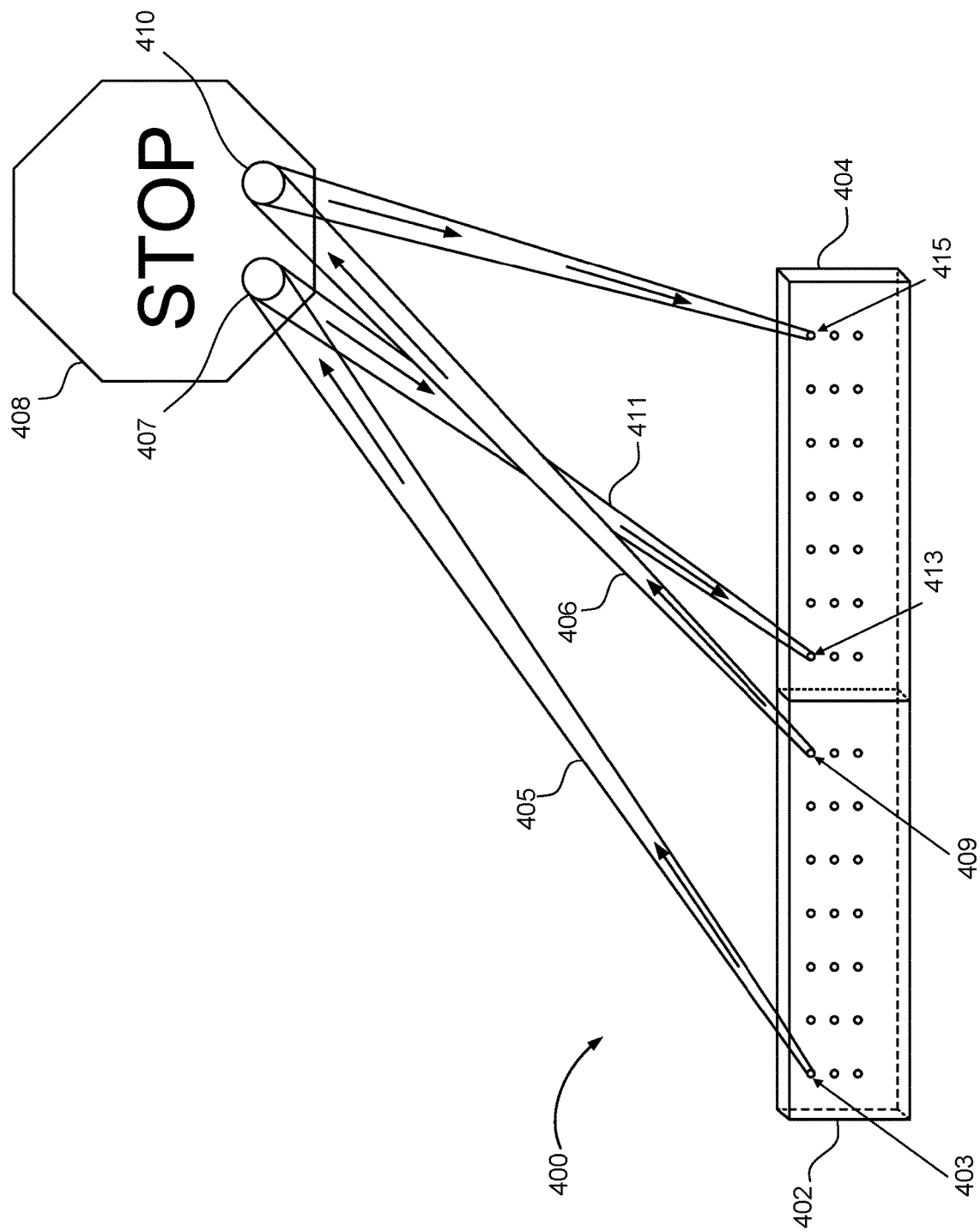
FIG. 4 shows an illustrative example of the light transmission and detection process for a light ranging system according to some embodiments.

FIG. 4 shows an illustrative example of the light transmission and detection process for a light ranging system, according to some embodiments. FIG. 4 shows a light ranging system (e.g., solid state or and/or scanning) collecting three-dimensional distance data of a volume or scene that surrounds the system. FIG. 4 is an idealized drawing to highlight relationships between emitters and sensors, and thus other components are not shown.

Light ranging system 400 includes a light emitter array 402 and a light sensor array 404. The light emitter array 402 includes an array of light emitters, e.g., an array of VCSELs and the like, such as emitter 403 and emitter 409. Light sensor array 404 includes an array of photosensors, e.g., sensors 413 and 415. The photosensors can be pixelated light sensors that employ, for each pixel, a set of discrete photodetectors such as single photon avalanche diodes (SPADs) and the like. However, various embodiments can deploy any type of photon sensors.

Each emitter can be slightly offset from its neighbor and can be configured to transmit light pulses into a different field of view from its neighboring emitters, thereby illuminating a respective field of view associated with only that emitter. For example, emitter 403 emits an illuminating beam 405 (formed from one or more light pulses) into the circular field of view 407 (the size of which is exaggerated for the sake of clarity). Likewise, emitter 409 emits an illuminating beam 406 (also called an emitter channel) into the circular field of view 410. While not shown in FIG. 4 to avoid complication, each emitter emits a corresponding illuminating beam into its corresponding field of view resulting in a 2D array of fields of view being illuminated (21 distinct fields of view in this example).

Each field of view that is illuminated by an emitter can be thought of as a pixel or spot in the corresponding 3D image that is produced from the ranging data. Each emitter channel can be distinct to each emitter and be non-overlapping with other emitter channels, i.e., there is a one-to-one mapping between the set of emitters and the set of non-overlapping fields or view. Thus, in the example of FIG. 4, the system can sample 21 distinct points in the 3D space. A denser sampling of points can be achieved by having a denser array of emitters or by scanning angular position of the emitter beams over time such that one emitter can sample several points in space. As described above, scanning can be accomplished by rotating the entire emitter/sensor assembly.

Each sensor can be slightly offset from its neighbor and, like the emitters described above, each sensor can see a different field of view of the scene in front of the sensor. Furthermore, each sensor's field of view substantially coincides with, e.g., overlaps with and is the same size as a respective emitter channel's field of view.

In FIG. 4, the distance between corresponding emitter-sensor channels is exaggerated relative to the distance to objects in the field of view. In practice, the distance to the objects in the field of few is much greater than the distance between corresponding emitter-sensor channels and thus the path of light from the emitter to the object is approximately parallel to the path of the reflected light back from the object to the sensor (i.e., it is almost "back reflected"). Accordingly, there is a range of distances in front of the system 400 over which the fields of view of individual sensors and emitters are overlapped.

Because the fields of view of the emitters are overlapped with the fields of view of their respective sensors, each sensor channel ideally can detect the reflected illumination beam that originates from its respective emitter channel with ideally no cross-talk, i.e., no reflected light from other illuminating beams is detected. Thus, each photosensor can correspond to a respective light source. For example, emitter 403 emits an illuminating beam 405 into the circular field of view 407 and some of the illuminating beam reflects from the object 408. Ideally, a reflected beam 411 is detected by sensor 413 only. Thus, emitter 403 and sensor 413 share the same field of view, e.g., field of view 407, and form an emitter-sensor pair. Likewise, emitter 409 and sensor 415 form an emitter-sensor pair, sharing field of view 410. While the emitter-sensor pairs are shown in FIG. 4 as being in the same relative locations in their respective array, any emitter can be paired with any sensor depending on the design of the optics used in the system.

During a ranging measurement, the reflected light from the different fields of view distributed around the volume surrounding the LIDAR system is collected by the various sensors and processed, resulting in range information for any objects in each respective field of view. As described above, a time-of-flight technique can be used in which the light emitters emit precisely timed pulses, and the reflections of the pulses are detected by the respective sensors after some elapsed time. The elapsed time between emission and detection and the known speed of light is then used to compute the distance to the reflecting surface. In some embodiments, additional information can be obtained by the sensor to determine other properties of the reflecting surface in addition to the range. For example, the Doppler shift of a pulse can be measured by the sensor and used to compute the relative velocity between the sensor and the reflecting surface. The pulse strength can be used to estimate the target reflectivity, and the pulse shape can be used to determine if the target is a hard or diffuse material.

In some embodiments, the LIDAR system can be composed of a relatively large 2D array of emitter and sensor channels and operate as a solid state LIDAR, i.e., it can obtain frames of range data without the need to scan the orientation of the emitters and/or sensors. In other embodiments, the emitters and sensors can be scanned, e.g., rotated about an axis, to ensure that the fields of view of the sets of emitters and sensors sample a full 360 degree region (or some useful fraction of the 360 degree region) of the surrounding volume. The range data collected from the scanning system, e.g., over some predefined time period, can then be post-processed into one or more frames of data that can then be further processed into one or more depth images or 3D point clouds. The depth images and/or 3D point clouds can be further processed into map tiles for use in 3D mapping and navigation applications.

C. Multiple Photodetectors in Each Photosensor

Figure 5:
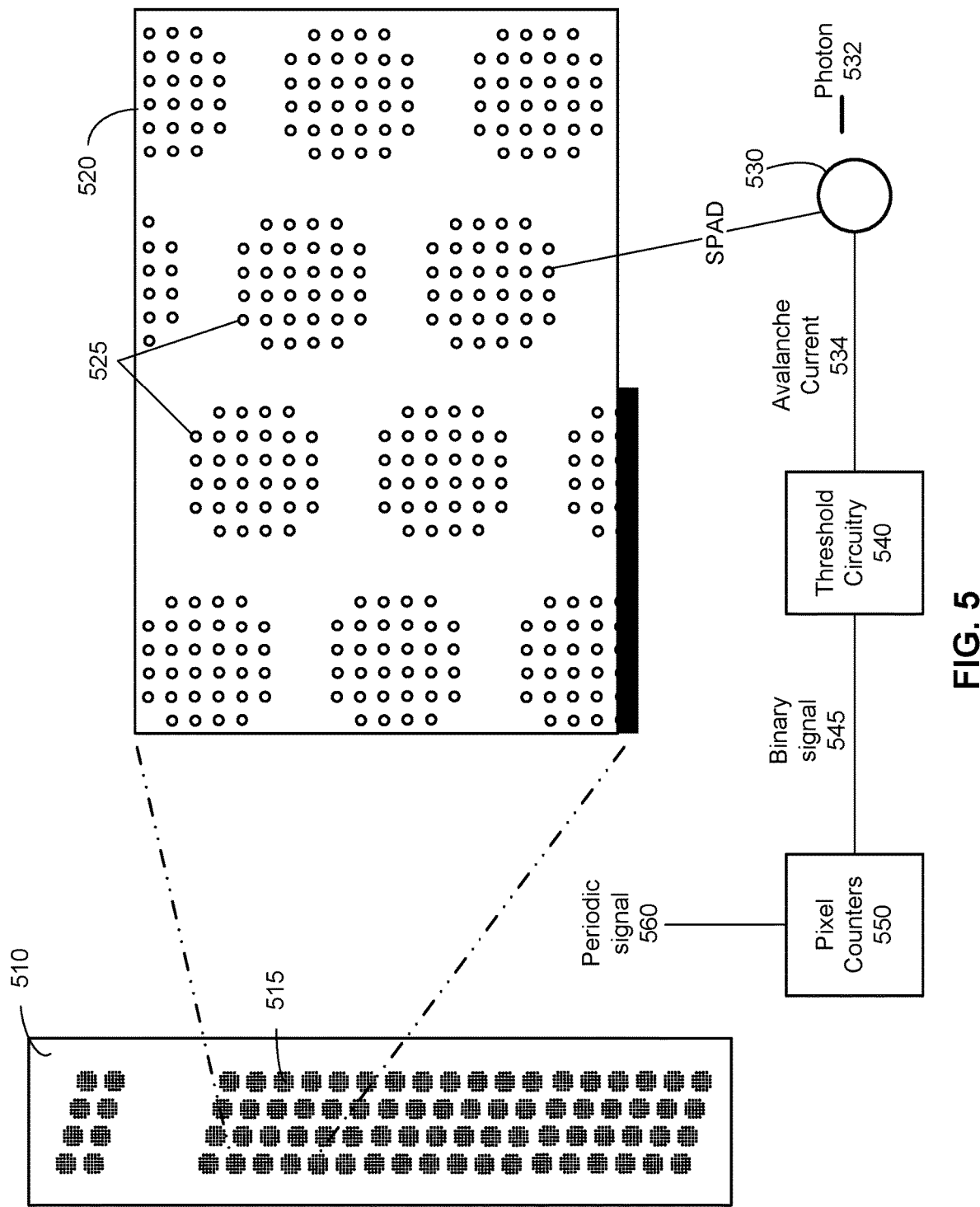
FIG. 5 shows various stages of a sensor array and associated electronics according to embodiments of the present invention.

FIG. 5 shows various stages of a sensor array and associated electronics according to embodiments of the present invention. Array 510 shows photosensors 515 that each correspond to a different pixel. Array 510 can be a staggered array. In this specific example, array 510 is 18×4 photosensors. Array 510 can be used to achieve a high resolution (e.g., 72×1024) as the implementation is amenable to sweeping.

Array 520 shows a magnified view of a portion of array 510. As can be seen, each photosensor 515 is composed of a plurality of photodetectors 525. Signals from the photodetectors of a pixel collectively contribute to a measurement for that pixel.

In some embodiments, each pixel has a multitude of single-photon avalanche diode (SPAD) units that increase the dynamic range of the pixel itself. Each SPAD can have an analog front end circuit for biasing, quenching, and recharging. SPADs are normally biased with a biased voltage above the breakdown voltage. A suitable circuit senses the leading edge of the avalanche current, generates a standard output pulse synchronous with the avalanche build-up, quenches the avalanche by lowering the bias down below the breakdown voltage, and restore the photodiode to the operative level.

The SPADs may be positioned so as to maximize the fill factor in their local area, or a microlens array may be used, which allows for high optical fill factors at the pixel level. Accordingly, an imager pixel can includes an array of SPADs to increase the efficiency of the pixel detector. A diffuser may be used to spreads rays passed through an aperture and collimated by a microlens. The can diffuser serves to spread the collimated rays in a way that all the SPADs belonging to the same pixel receive some radiation.

FIG. 5 further shows a particular photodetector 530 (e.g., a SPAD) that detects a photon 532. In response to the detection, photodetector 530 produces an avalanche current 534 of charge carriers (electrons or holes). Threshold circuitry 540 conditions the avalanche current 534 by comparing it to a threshold. When a photon is detected and photodetector 530 is functioning properly, the avalanche current 534 rises above the comparator threshold and threshold circuitry 540 produces a temporally accurate binary signal 545 indicating the accurate time of the SPAD current avalanche, which is in turn an accurate measurement of the photon arrival. The correlation of the current avalanche to the photon arrival can occur with a resolution of nanoseconds, thereby providing high timing resolution. The rising edge of binary signal 545 can be latched by pixel counters 550.

Binary signal 545, avalanche current 534, and pixel counters 550 are examples of data values that can be provided by a photosensor composed of one or more SPADs. The data values can determined from respective signals from each of the plurality of photodetectors. Each of the respective signals can be compared to a threshold to determine whether a corresponding photodetector triggered. Avalanche current 534 is an example of an analog signal, and thus the respective signals can be analog signals.

Pixel counters 550 can use binary signal 545 to count the number of photodetectors for a given pixel that have been triggered by one or more photons during a particular time bin (e.g., a time window of 1, 2, 3, etc. ns) as controlled by periodic signal 560. Pixel counters 550 can store counters for each of a plurality of time bins for a given measurement. The value of the counter for each time bind can start at zero and be incremented based on binary signal 545 indicating a detection of a photon. The counter can increment when any photodetector of the pixel provide such a signal.

Periodic signal 560 can be produced by a phase-locked loop (PLL) or delay-locked loop (DLL) or any other method of producing a clock signal. The coordination of periodic signal 560 and pixel counter 550 can act as a time-to-digital converter (TDC), which is a device for recognizing events and providing a digital representation of the time they occurred. For example, a TDC can output the time of arrival for each detected photon or optical pulse. The measure time can be an elapsed time between two events (e.g., start time and detected photon or optical pulse) rather than an absolute time. Periodic signal 560 can be a relatively fast clock that switches between a bank of memory comprising pixel counter 550. Each register in memory can correspond to one histogram bin, and the clock can switch between them at the sampling interval. Accordingly, a binary value indicating a triggering can be sent to the histogram circuitry when the respective signal is greater than the threshold. The histogram circuitry can aggregate binary values across the plurality of photodetectors to determine a number of photodetectors that triggered during a particular time bin.

The time bins can be measured relative to a start signal, e.g., at start time 315 of FIG. 3. Thus, the counters for time bins right after the start signal may have low values corresponding to a background signal, e.g., background light 330. A last time bin can correspond to an end of a detection time interval (also called a shot) for a given pulse train, which is further described in the next section. The number of cycles of periodic signal 560 since a start time can act as a timestamp for when a rising edge of avalanche current 534 indicates a detected photon. The timestamp corresponds to the time bin for a particular counter in pixel counters 550. Such an operation is different from a simple analog-to-digital converter (ADC) following a photodiode (e.g., as for an avalanche photodiode (APD)). Each of the counters of the time bins can correspond to a histogram, which is described in more detail below. Therefore, while the APD is a linear amplifier for the input optical signal with limited gain, the SPAD is a trigger device that provides a binary output of yes/no for a triggering event occurring in a time window.

D. Pulse Trains

Ranging may also be accomplished by using a pulse train, defined as containing one or more pulses. Within a pulse train, the number of pulses, the widths of the pulses, and the time duration between pulses (collectively referred to as a pulse pattern) can be chosen based on a number of factors, some of which includes:

1— Maximum laser duty cycle—The duty cycle is the fraction of time the laser is on. For a pulsed laser this could be determined by the FWHM as explained above and the number of pulses emitted during a given period.
2— Eye safety limits—This is determined by maximum amount of radiation a device can emit without damaging the eyes of a bystander who happens to be looking in the direction of the LIDAR system.
3— Power consumption—This is the power that the emitter consumes for illuminating the scene.

For example, the spacing between pulses in a pulse train can be on the order of single digits or 10s of nanoseconds.

Multiple pulse trains can be emitted during the time span of one measurement. Each pulse train can correspond to a different time interval, e.g., a subsequent pulse train is not emitted until an expiration of the time limit for detecting reflected pulses of a previous pulse train.

For a given emitter or laser device, the time between the emissions of pulse trains determines the maximum detectable range. For example, if pulse train A is emitted at time $t_0=0$ ns, and pulse train B is emitted at time $t_1=1000$ ns, then one must not assign reflected pulse trains detected after $t_1$ to pulse train A, as they are much more likely to be reflections from pulse train B. Thus, the time between pulse trains and the speed of light define a maximum bound on the range of the system given in the following equation.

$$R_{max}=c \times (t_1-t_0)/2$$

The time between shots (emission and detection of pulse trains) can be on the order of 1 µs to allow enough time for the entire pulse train to travel to a distant object approximately 150 meters away and then back.

III. Histogram Signals from Photodetectors

One mode of operation of a LIDAR system is time-correlated single photon counting (TCSPC), which is based on counting single photons in a periodic signal. This technique works well for low levels of periodic radiation which is suitable in a LIDAR system. This time correlated counting may be controlled by periodic signal 560 of FIG. 5 and may use time bins, as discussed for FIG. 5.

The frequency of the periodic signal can specify a time resolution within which data values of a signal are measured. For example, one measured value can be obtained for each photosensor per cycle of the periodic signal. In some embodiments, the measurement value can be the number of photodetectors that the triggered during that cycle. The time period of the periodic signal corresponds to time bin, with each cycle being a different time bin.

Figure 6:
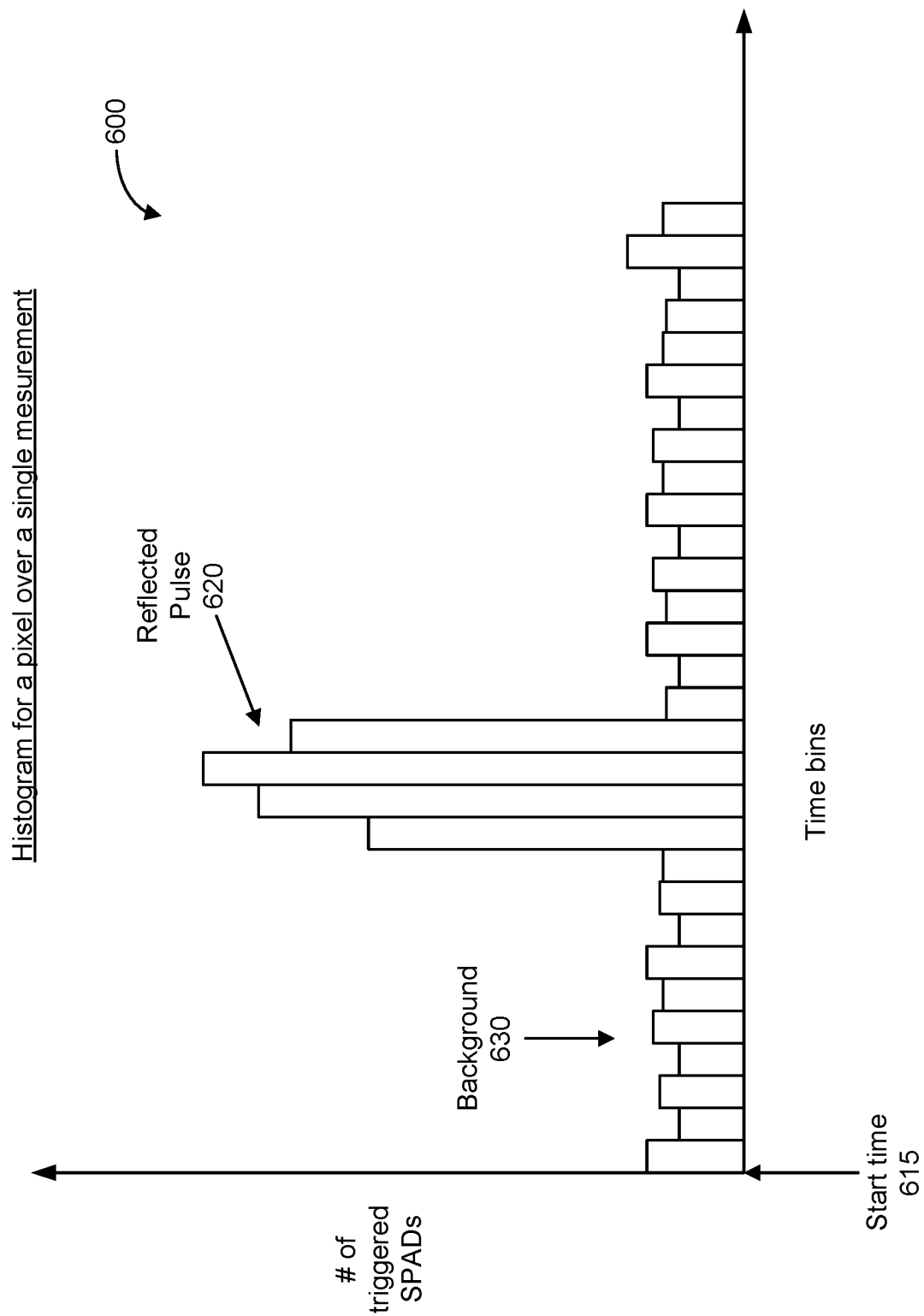
FIG. 6 shows a histogram according to embodiments of the present invention.

FIG. 6 shows a histogram 600 according to embodiments of the present invention. The horizontal axis corresponds to time bins as measured relative to start time 615. As described above, start time 615 can correspond to a start time for the pulse train. Any offsets between rising edges of the first pulse of a pulse train and the start time for either or both of a pulse train and a detection time interval can be accounted for wherein determining the received time to be used for the time-of-flight measurement. The vertical axis corresponds to the number of triggered SPADs. In certain embodiments, the vertical axis may correspond to an output of an ADC that follows an APD. For example, APDs can exhibit traditional saturation effects, such as a constant maximum signal rather than the dead-time based effects of SPADs. Some effects can occur for both SPADs and APDs, e.g., pulse smearing of very oblique surfaces may occur for both SPADs and APDs.

The counter for each of the time bins corresponds to a different bar in histogram 600. The counters at the early time bins are relatively low and correspond to background noise 630. At some point, a reflected pulse 620 is detected. The corresponding counters are much larger, and may be above a threshold that discriminate between background and a detected pulse. The reflected pulse 620 (after digitizing) is shown corresponding to four time bins, which might result from a laser pulse of a similar width, e.g., a 4 ns pulse when time bins are each 1 ns. But, as described in more detail below, the number of time bins can vary, e.g., based on properties of a particular object in an angle of incidence of the laser pulse.

The temporal location of the time bins corresponding to reflected pulse 620 can be used to determine the received time, e.g., relative to start time 615. As described in more detail below, matched filters can be used to identify a pulse pattern, thereby effectively increasing the signal-to-noise ratio, but also to more accurately determine the received time. In some embodiments, the accuracy of determining a received time can be less than the time resolution of a single time bin. For instance, for a time bin of 1 ns, that resolution would correspond to about 15 cm. However, it can be desirable to have an accuracy of only a few centimeters.

Accordingly, a detected photon can result in a particular time bin of the histogram being incremented based on its time of arrival relative to a start signal, e.g., as indicated by start time 615. The start signal can be periodic such that multiple pulse trains are sent during a measurement. Each start signal can be synchronized to a laser pulse train, with multiple start signals causing multiple pulse trains to be transmitted over multiple detection intervals. Thus, a time bin (e.g., from 200 to 201 ns after the start signal) would occur for each detection interval. The histogram can accumulate the counts, with the count of a particular time bin corresponding to a sum of the measured data values all occurring in that particular time bin across multiple shots. When the detected photons are histogrammed based on such a technique, it results in a return signal with a signal to noise ratio greater than from a single pulse train by the square root of the number of shots taken.

Figure 7:
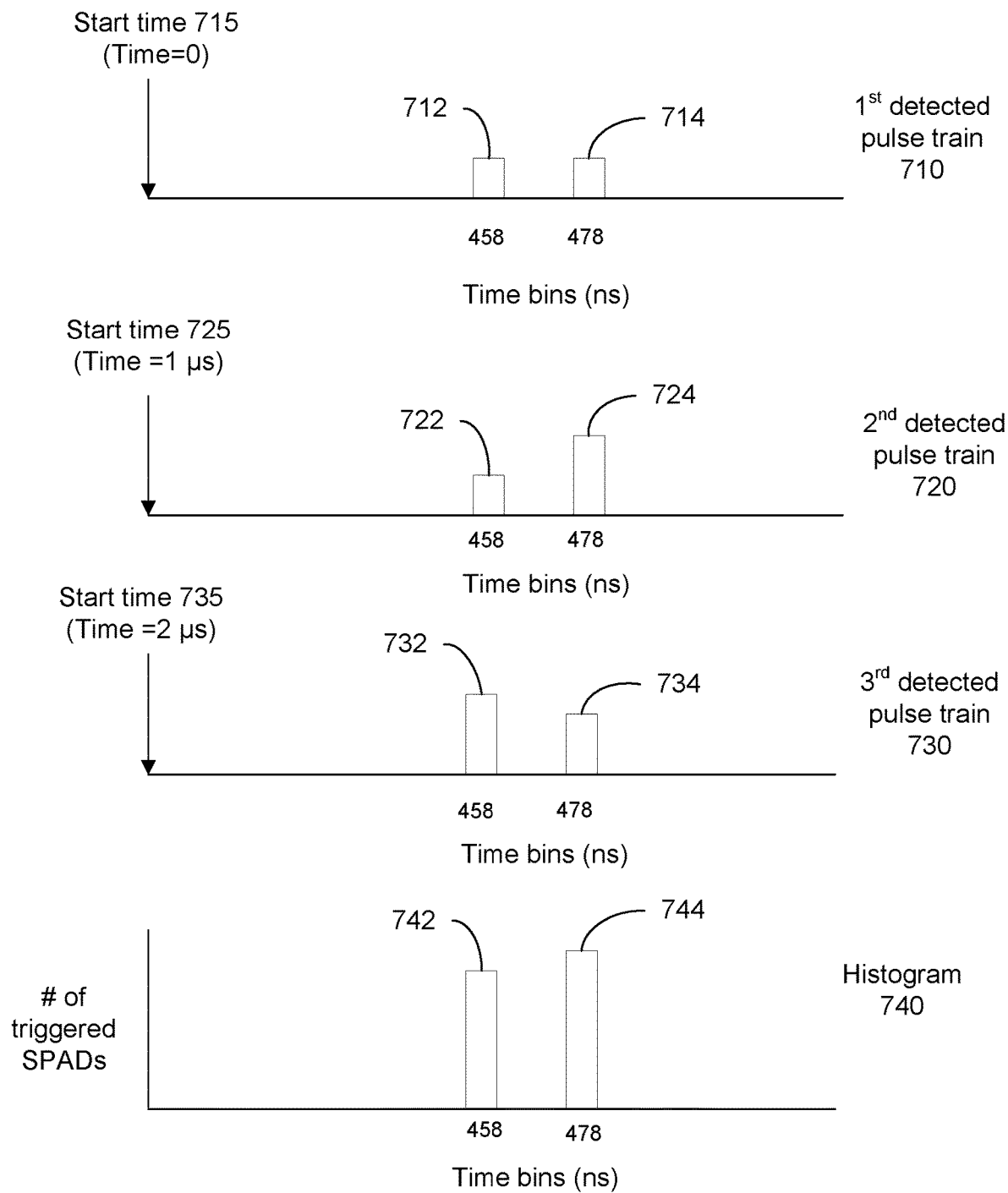
FIG. 7 shows the accumulation of a histogram over multiple pulse trains for a selected pixel according to embodiments of the present invention.

FIG. 7 shows the accumulation of a histogram over multiple pulse trains for a selected pixel according to embodiments of the present invention. FIG. 7 shows three detected pulse trains 710, 720 and 730. Each detected pulse train corresponds to a transmitted pulse train that has a same pattern of two pulses separated by a same amount of time. Thus, each detected pulse train has a same pulse pattern, as shown by two time bins having an appreciable value. Counters for other time bins are not shown for ease of illustration, although the other time bins may have relatively low non-zero values.

In the first detected pulse train 710, the counters for time bins 712 and 714 are the same. This can result from a same number of photodetectors detecting a photon during the two time bins. Or, in other embodiments, approximately the same number of photons being detected during the two time bins. In other embodiments, more than one consecutive time bin can have a consecutive non-zero value; but for ease of illustration, individual nonzero time bins have been shown.

Time bins 712 and 714 respectively occur 458 ns and 478 ns after start time 715. The displayed counters for the other detected pulse trains occur at the same time bins relative to their respective start times. In this example, start time 715 is identified as occurring at time 0, but the actual time is arbitrary. The first detection interval for the first detected pulse train can be 1 µs. Thus, the number of time bins measured from start time 715 can be 1,000. After, this first detection interval ends, a new pulse train can be transmitted and detected. The start and end of the different time bins can be controlled by a clock signal, which can be part circuitry that acts as a time-to-digital converter (TDC), e.g., as is described in FIG. 5.

For the second detected pulse train 720, the start time 725 is at 1 µs, e.g., at which the second pulse train can be emitted. Such a separate detection interval can occur so that any pulses transmitted at the beginning of the first detection interval would have already been detected, and thus not cause confusion for pulses detected in the second time interval. For example, if there is not extra time between shots, then the circuitry could confuse a retroreflective stop sign at 200 m with a much less reflective object at 50 m (assuming a shot period of about 1 us). The two detection time intervals for pulse trains 710 and 720 can be the same length and have the same relationship to the respective start time. Time bins 722 and 724 occur at the same relative times of 458 ns and 478 ns as time bin 712 and 714. Thus, when the accumulation step occurs, the corresponding counters can be added. For instance, the counter values at time bin 712 and 722 can be added together.

For the third detected pulse train 730, the start time 735 is at 2 µs, e.g., in which the third pulse train can be emitted. Time bin 732 and 734 also occur at 458 ns and 478 ns relative to its respective start time 735. The counters at different time bins may have different values even though the emitted pulses have a same power, e.g., due to the stochastic nature of the scattering process of light pulses off of objects.

Histogram 740 shows an accumulation of the counters from three detected pulse trains at time bins 742 and 744, which also correspond to 458 ns and 478 ns. Histogram 740 could have less number of time bins that are measured during the respective detection intervals, e.g., as a result of dropping time bins in the beginning or the end, or that have values less than a threshold. In some implementations, about 10-30 time bins can have appreciable values, depending on the pattern for a pulse train.

As examples, the number of pulse trains emitted during a measurement to create a single histogram can be around 1-40 (e.g., 24), but can also be much higher, e.g., 50, 100, or 500. Once a measurement is completed, the counters for the histogram can be reset, and a set of pulse trains can be emitted to perform a new measurement. In various embodiments and depending on the number of detection intervals in the respective duration, measurements can be performed every 25, 50, 100, or 500 µs. In some embodiments, measurement intervals can overlap, e.g., so a given histogram corresponds to a particular sliding window of pulse trains. In such an example, memory can exist for storing multiple histograms, each corresponding to a different time window. Any weights applied to the detected pulses can be the same for each histogram, or such weights could be independently controlled.

IV. Histogram Data Path

Figure 8:
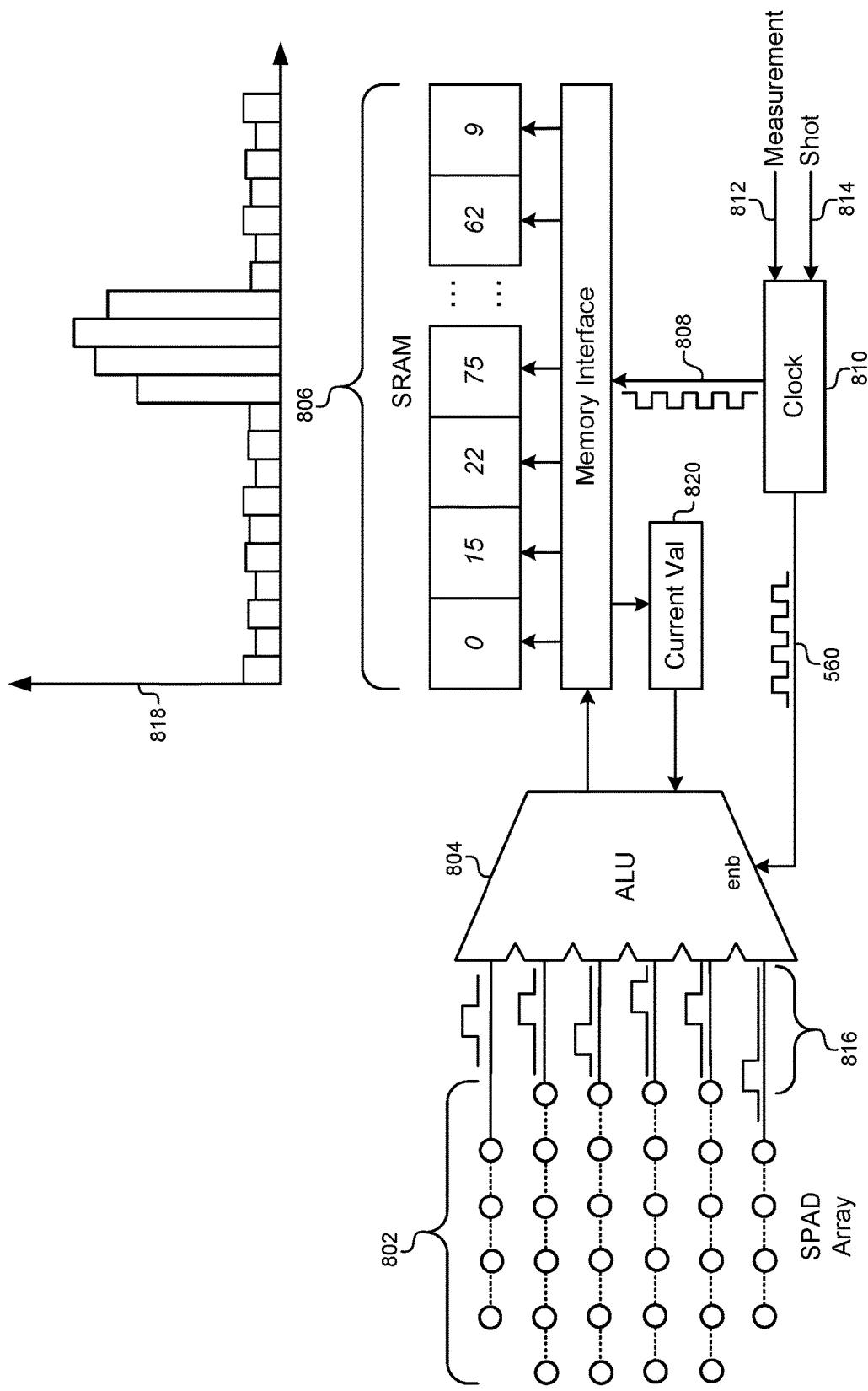
FIG. 8 shows a circuit for receiving photons and generating a set of signals that are stored in a memory representing histogram, according to some embodiments.

FIG. 8 shows a circuit for receiving photons and generating a set of signals that are stored in a memory representing histogram, according to some embodiments. As described above in relation to FIG. 5, an array of photosensors may be used to receive reflected pulses and ambient light in an optical measurement system. A single photosensor 802 may include a plurality of photodetectors. Each photodetector may be implemented by a SPAD or other light-sensitive sensor, and the photodetectors may be arranged in a grid pattern for the photosensor 802 as illustrated in FIG. 8.

Each photodetector in the photosensor 802 may include analog front-end circuitry for generating an output signal indicating when photons are received by the photodetectors. For example, referring back to FIG. 5, the avalanche current 534 from a SPAD may trigger the threshold circuitry 540 to generate the output binary signal 545. Turning back to FIG. 8, each photodetector in the photosensor 802 may generate its own signal corresponding to received photons. Thus, the photosensor 802 may generate a set of signals 816 corresponding to the number of photodetectors in the photosensor 802. The photosensor 802 may also be referred to as a "pixel" or a "pixel sensor," as it may correspond to a single pixel of information when displayed or analyzed in later stages of the optical measurement system. When signals are generated in response to received photons (e.g., transitioning from a logical "0" to a logical "1"), this may be referred to as a "positive" signal.

An arithmetic logic unit (ALU) 804 may be used to implement the functionality of the pixel counter 550 from FIG. 5. Specifically, the ALU 804 may receive the set of signals 816 from the individual photodetectors of the photosensor 802 and aggregate a number of these signals that each indicate the detection of a photon. The ALU 804 may include a combinational digital electronic circuit that performs arithmetic and/or other bitwise operations on the set of signals 816. For example, the ALU 804 may receive each of the set of signals 816 as a binary signal (i.e., a "0" or a "1") as an input or operand to the ALU 804. By aggregating or adding inputs together, the ALU 804 may count a number positive signals in the set of signals 816 that indicate that photons have been received within a particular time bin. For example, by adding each of the signals indicating a "1" signal level, the output of the ALU 804 may indicate the number of signals in the set of signals 816 that are associated with photodetectors that in turn received photons during the time bin.

The ALU 804 is designed specifically to receive at least a number of inputs that correspond to the number of photodetectors in the photosensor 802. In the example of FIG. 8, the ALU 804 may be configured to receive 32 parallel inputs that are a single bit wide. Internally, the ALU 804 may be implemented with digital logic gates to form a ripple-carry adder, a carry-lookahead adder, a carry-save adder, and/or any other type of adder that can aggregate a relatively large number of inputs with low propagation time. The output of the ALU 804 may be referred to as a "total signal count" and may be represented as an n-bit binary number output from the ALU 804 or from a stage of the ALU 804.

As described above, the output of the ALU 804 may characterize the total number of photons received by the photosensor 802 during a particular time bin. Each time the ALU 804 completes an aggregation operation, the total signal count can be added to a corresponding memory location in a memory 806 representing histogram 818. In some embodiments, the memory 806 may be implemented using an SRAM. Thus, over the course of multiple shots (with each shot including a pulse train) the total signal count from the ALU 804 can be aggregated with an existing value in a corresponding memory location in the memory 806. A single measurement may be comprised of a plurality of shots that populate the memory 806 to generate the histogram 818 of values in the time bins that can be used to detect reflected signals, ambient noise, peaks, and/or other signals of interest.

The ALU 804 may also perform a second aggregation operation that adds the total signal count to an existing value in a memory location of the memory 806. Recall from FIG. 7 that with each shot, a new total signal count may be added to an existing value in the corresponding time bin of the memory 806. In this manner, the histogram 818 can be gradually constructed in the memory 806 over a number of shots. When the total signal count is generated by the ALU 804, a current value 820 of a corresponding memory location for that time bin can be retrieved from the memory 806. The current value 820 can be provided as an operand to the ALU 804, which can be combined with the total signal count from the set of signals 816. In some embodiments, the ALU 804 can be composed of a first stage and a second stage, where the first stage calculates the total signal count from the photosensor 802, and the second stage combines the total signal count with the current value 820 from that time bin's memory location in the memory 806. In some embodiments, the aggregation of the set of signals 816 and the aggregation of total signal count and the current value 820 may be carried out as a single operation. Thus, even though these two operations may functionally be described as separate "aggregations," they may in fact be performed together using a combination of parallel and sequential circuitry in the ALU 804.

As described above in relation to FIG. 5, the ALU 804 may receive a periodic signal 560 that triggers the aggregation operation(s). The periodic signal 560 may be generated using any of the techniques described above. The periodic signal 560 may define the length of each time bin. In some embodiments, the periodic signal 560 and the corresponding time bins can be measured relative to a start signal as illustrated in FIG. 3. Each cycle of the periodic signal 560 can cause aggregation operations to execute in the ALU 804 and may cause the memory address of the memory 860 increment to the next time bin. For example, a rising edge of the periodic signal 560 may cause the ALU 804 to produce a result that aggregates the total signal count and the current value 820 together. A corresponding periodic signal 808 may also be sent to a memory interface circuit that increments an address to a memory location of a current time bin such that each cycle also moves to the next time bin in the memory 806.

A clock circuit 810 may be used to generate the periodic signal 560 based on inputs that define shots and measurements for the optical measurement system. For example, a shot input 814 may correspond to the start signal illustrated in FIG. 3. The shot input 814 may reset the address for the memory 806 to a beginning memory location corresponding with a first time bin of the histogram 818. The shot input 814 may also cause the clock circuit 810 to begin generating the periodic signal 560 for the ALU 804 and/or the periodic signal 808 that increments the address for the memory 806. Additionally, the clock circuit 810 may receive a measurement input 812 that defines the beginning/end of a measurement. A measurement may be comprised of a plurality of shots that incrementally build the histogram 818. The measurement signal 812 may be used to reset the values in the memory 806 such that the histogram can start over for each new measurement.

The memory 806 may include a plurality of registers that accumulate photon counts from photodetectors. By accumulating photon counts in respective registers corresponding to time bins, the registers in the memory 806 can store photon counts based on arrival times of the photons. For example, photons arriving in a first time bin can be stored in a first register in the memory 806, photons arriving in a second time bin can be stored in a second register in the memory 806, and so forth. Each "shot" may include one traversal through each of the registers in the memory 806 corresponding to a time bin for that photosensor. The shot input 814 may be referred to as an "enable" signal for the plurality of registers in the memory 806 in that the shot input 814 enables the registers in the memory 806 to store results from the ALU 804 during the current shot.

The periodic signal 560 can be generated such that it is configured to capture the set of signals 816 as they are provided asynchronously from the photosensor 802. For example, the threshold circuitry 540 may be configured to hold the output signal high for a predetermined time interval. The periodic signal 560 may be timed such that it has a period that is less than or equal to the hold time for the threshold circuitry 540. Alternatively, the period of the periodic signal 560 may be a percentage of the hold time for the threshold circuitry 540, such as 90%, 80%, 75%, 70%, 50%, 110%, 120%, 125%, 150%, 200%, and so forth. Some embodiments may use rising-edge detection circuitry as illustrated in FIG. 5 to convert the asynchronous signals from the photodetectors into single clock strobes that use the same clock that runs the ALU 804. This may guarantee that photons are not counted more than once. Other embodiments may alternatively oversample the asynchronous pulses from the photodetectors or use brute-force rising-edge detection.

Figure 9:
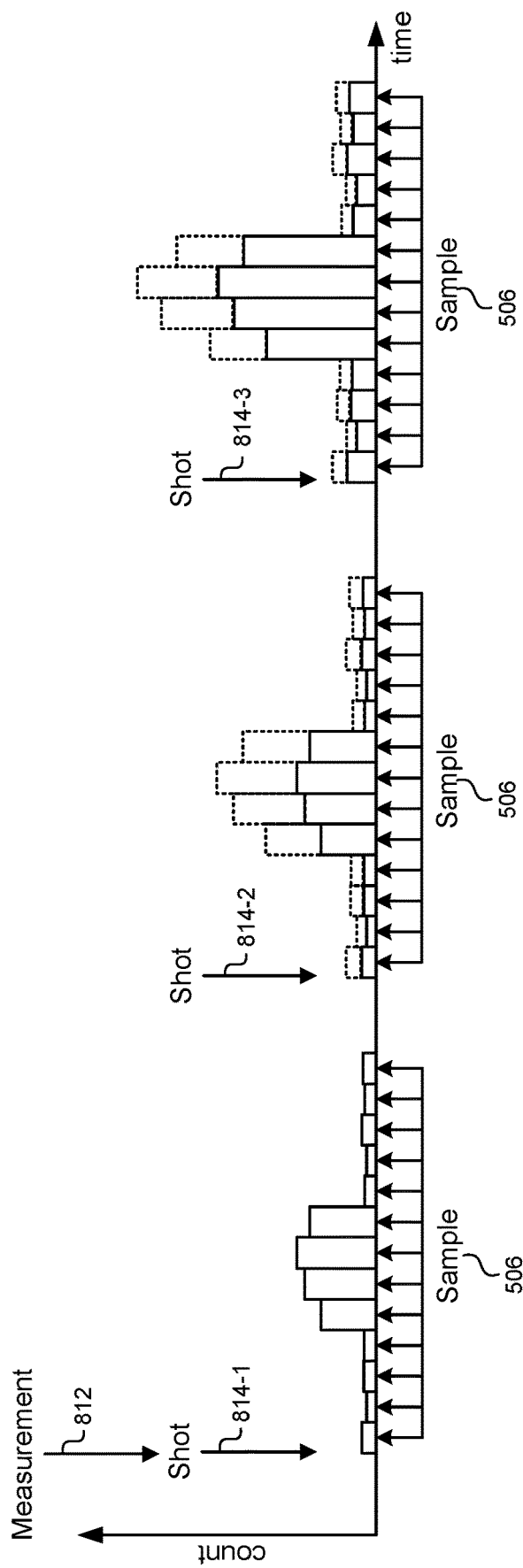
FIG. 9 shows the timing associated with different shots in a measurement, according to some embodiments.

FIG. 9 shows the timing associated with different shots in a measurement, according to some embodiments. The vertical axis represents the total number of photodetector signals measured for a single photosensor. For example, the vertical axis may represent a total photon count. The horizontal axis represents time. When a new optical measurement is started as indicated by the measurement signal 812, a first shot can begin with the receipt of the shot input 814-1 as a start signal. The periodic signal 506 illustrates how each clocking of the ALU 804 corresponds to a single time bin and corresponding memory location in the memory 806.

With each subsequent shot, the histogram can be constructed in the memory 806 as illustrated in FIG. 9. Each time a shot input 814 is received, the addressing of the memory 806 can be reset such that new total signal count can be added to the existing signal counts. In the example of FIG. 9, there is a non-zero time interval of separation between each shot. For example, the shot started by the shot input 814-1 ends, and a non-zero time interval elapses before the shot defined by the shot input 814-2 begins. Alternatively, some embodiments may not have a delay between subsequent shots such that the periodic signal 506 clocks continuously throughout the measurement. Subsequent shot inputs 814-2, 814-3 may then define both the end of a previous shot and the beginning of a subsequent shot.

In some embodiments, the timing of the measurement signal 812, the shot input 814, and the periodic signal 506 that clocks the ALU 804 may all be coordinated and generated relative to each other. Thus, the clocking of the ALU may be triggered by, and dependent on, the start signal for each shot. Additionally the period of the periodic signal 506 may define the length of each time bin associated with each memory location in the histogram.

The data path illustrated in FIG. 8 is primarily configured to build the histogram 818 over a number of shots. However, the histogram may only populated during shots in some embodiments. Any photons received between shots would not be aggregated by the ALU 804 in a time bin and would not be stored in the memory 806. Additionally, after each measurement is complete and before a subsequent measurement begins, the contents of the memory 806 may be reset. Therefore, photons received before and/or after a current measurement may not be saved or readily available. Furthermore, no total count of all photons received in the histogram is readily available in the histogram data path, and no total count of all photons received during a measurement cycle is available if there are non-zero intervals between shots when the histogram is disabled. To record received photons in a continuous manner that is not reliant on the shot/measurement timing, a second parallel data path may be used in addition to the histogram data path illustrated in FIG. 8.

V. Single-Pixel Memory Configurations

As described above, the histogram data path may typically include a single photosensor made up of a plurality of individual photodetectors. The single photosensor may be connected to a single arithmetic logic circuit to aggregate photon counts received during individual time bins during an optical measurement. The arithmetic logic circuit may pass the aggregated photon count from its corresponding photosensor to a histogram memory that includes a plurality of individual registers. Each of the registers may correspond to a single time bin into which successive photon counts are aggregated as the optical measurement system executes a plurality of shots during the optical measurement. Thus, the embodiments described above may pair a single photosensor with a single arithmetic logic unit and a single histogram memory block.

Additional embodiments described below may allow a plurality of photosensors to share a single histogram memory. Instead of using a memory that is a single bin wide, these embodiments may use memory blocks that can store photon counts from multiple time bins in a single memory row. A buffer may be provided to store aggregated photon counts that are received (1) from different photosensors, and/or (2) during different time bins. This allows the clock for the photosensors and the arithmetic logic circuit to run faster than the clock for the memory. Since the memory is often the slowest component in the histogram data path, this may increase the temporal resolution represented by the time bins and also may increase the spatial resolution due to more photosensors being used for a given temporal resolution. This also allows multiple photosensors to share a single memory. Since the memory is also often the largest physical component on an integrated circuit implementing the histogram data path, sharing the memory between multiple photosensors may reduce the total size of the histogram data path on the integrated circuit.

A. Single-Pixel, Single-Word Memories

Figure 10:
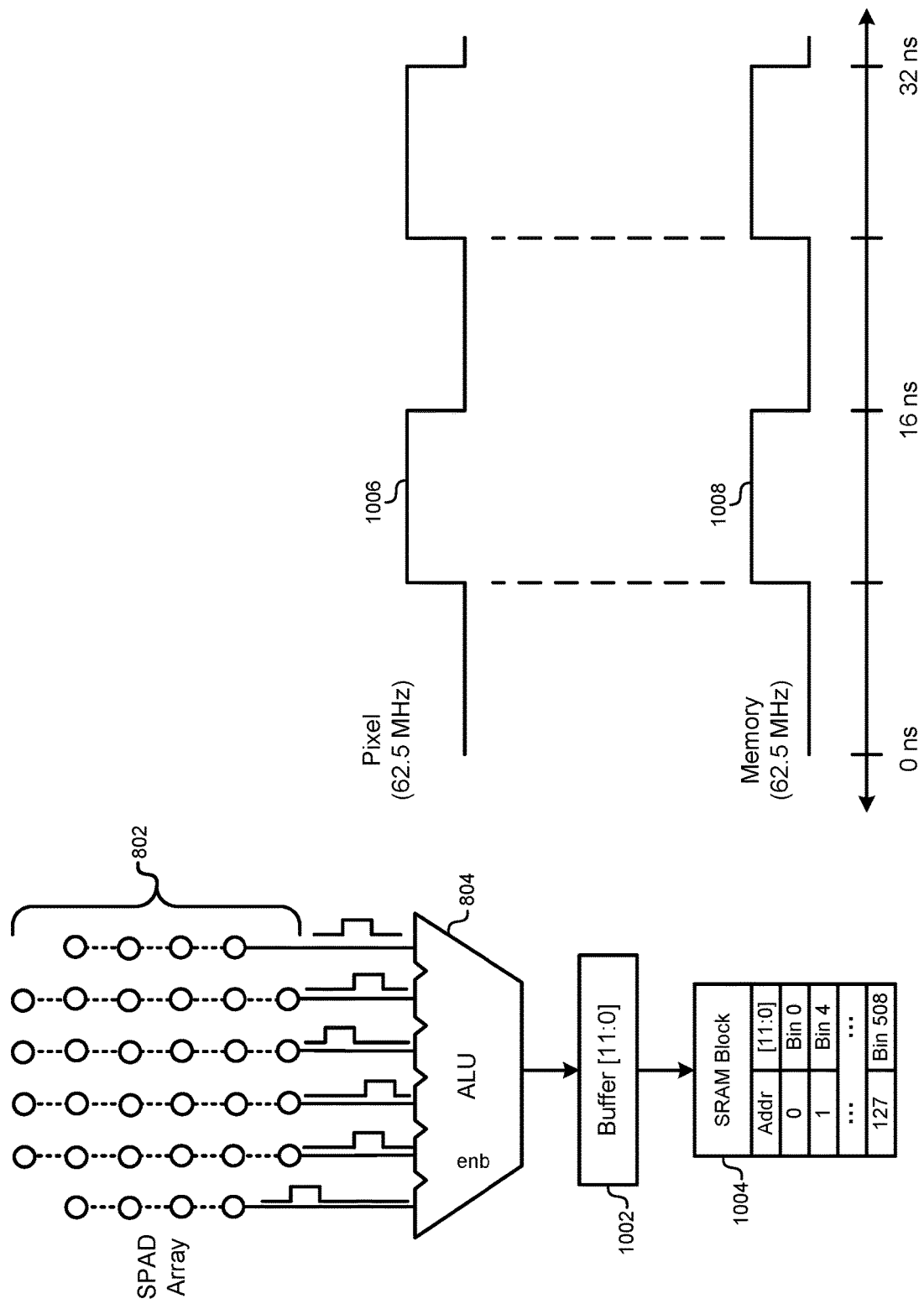
FIG. 10 illustrates a histogram data path with a single pixel paired with a single memory block, according to some embodiments.

FIG. 10 illustrates a histogram data path with a single pixel paired with a single memory block, according to some embodiments. As described in detail above, a photosensor 802 may include a plurality of photodetectors with threshold detection circuitry that causes positive signals (e.g., positive pulses) to be generated when photons are received by each of the photodetectors. These positive signals can be received by an arithmetic logic circuit 804 that aggregates a total number of photons received by the photodetectors during a single time bin in the optical measurement. The arithmetic logic circuit 804 may also add the total number of photons received to a value stored in a register representing that time bin. The register may be a memory location in a memory block or may be a temporary register storing intermediate calculation results. The term "bin" may refer to a time interval during a shot that corresponds to a value in the histogram memory. Values for a bin may be stored in a register or location in a memory block corresponding to that value in the histogram represented by the memory block. This allows the histogram data path to form a histogram of values received during multiple "shots" during which pulse trains are repeatedly transmitted by the optical measurement system.

In some embodiments, the arithmetic logic circuit 804 may provide the aggregated total of the current photon count to a buffer 1002. In the example of FIG. 10, the buffer 1002 may be sized to represent a single time bin, such that each new value latched into the single buffer 1002 represents photon count for a single time bin. For purposes of illustrating the operation of the histogram data path, a width of 12 bits may be used to represent a single time bin. However, this is not meant to be limiting. Some embodiments may use more than 12 bits to increase the number of photon counts that may be stored without saturating the buffer 1002. Other embodiments may use fewer than 12 bits to reduce the size of the data path and thereby reduce the integrated circuit footprint of the histogram data path and the power used by the histogram data path.

The buffer 1002 may receive the aggregated photon count from the arithmetic logic circuit 804 and provide the aggregated photon count to a memory block 1004. The memory block 1004 may comprise the histogram memory 806 described above in FIG. 8. For example, the memory block 1004 may be implemented using an SRAM. In these embodiments, the histogram memory may be implemented using one or more memory blocks. Therefore, a "memory block" may refer to a single instance of a memory unit on an integrated circuit implementing the optical measurement system. This terminology may be used to distinguish individual memory blocks from each other in the optical measurement system. Recall that the optical measurement system may include a large number of photosensors (e.g., 256 photosensors), each of which may be associated with an individual memory block. As will be described below, some embodiments may use more than one memory block to represent a histogram for a single photosensor. Therefore, a memory block refers to a single instance of a memory unit rather than all memory associated with a single photosensor. Depending on the embodiment, the histogram memory may be represented using a plurality of memory blocks, and/or multiple histogram memories for multiple pixels may be represented using a single memory block.

In FIG. 10, the memory block 1004 may have a width equal to the width of the buffer 1002. Each row in the memory block 1004 may correspond to a single time bin and may be populated using a single value from the buffer 1002. The memory block 1004 may also have a number of rows equal to the number of time bins in an optical measurement. In this example, the memory block 1004 may include 128 rows corresponding to 128 time bins in an optical measurement. This number of time bins is provided merely by way of example and is not meant to be limiting. Other embodiments may increase the temporal resolution of each time bin by dividing each shot into a larger number of time bins. Some embodiments may also increase the length of each shot such that more time bins are needed to represent the time interval for the shot. Conversely, some embodiments may decrease the number of time bins and rows in the memory block 1004 to decrease the temporal resolution of the time bins and/or to decrease the length of the time interval for the shot.

The buffer 1002 acts as an intermediate storage location between the arithmetic logic circuit 804 and the memory block 1004. Adding the buffer 1002 as an intermediary between the arithmetic logic circuit 804 and the memory block 1004 enables each of these circuit elements to operate independently using different clocks. Different configurations may clock the arithmetic logic circuit 804 faster than the memory block 1004 to increase temporal resolution and/or decrease pixel pitch, where buffer 1002 can be wider than a single time bin to instead represent multiple time bins and/or multiple pixels during the same time bin. For example, adding the buffer 1002 also may allow multiple photosensors to write to the buffer during a single time bin and thus share a single memory block 1004. This may also allow multiple memory blocks to share a single photosensor 802 by writing multiple time bins to the buffer, then writing the buffer to successive memory blocks each time it is filled. Each of these embodiments will be described in greater detail below.

In order to the clearly present the relationship between the memory blocks and the photosensors, the histogram data paths described herein may omit the explicit depiction of the operation of adding the current photon count from the photosensor to an existing photon count already stored in a register representing a time bin in the memory block 1004. Reference may be made to FIG. 8, where the memory interface may retrieve a current value 820 of previous photon aggregations from the histogram memory 806 for a current time bin. This value may be added to the current photon count for the time bin by the arithmetic logic circuit 804. In FIG. 10, this portion of the data path has been omitted for the sake of clarity. However, it will be understood that this operation may still take place either at the arithmetic logic circuit 804 or at the memory block 1004.

FIG. 10 illustrates a simplified example of a single photosensor 802 coupled with a single memory block 1004. The buffer 1002 is the same width as the memory block 1004. Therefore, the buffer 1002 may store photon counts from a single photosensor 802 for a single time bin in the histogram, and the memory block 1004 may store the contents of the buffer 1002 as a single time bin with each write operation. Each time the buffer 1002 is written to the memory block 1004, the memory block 1004 can increment its row address in preparation for receiving a photon count for a subsequent time bin. This configuration may be used in the histogram data path of FIG. 8 described above.

Because the size of the buffer 1002 and the size of each row in the memory block 1004 are the same, the photosensor 802, the arithmetic logic circuit 804, the buffer 1002, and the memory block 1004 may all be clocked using the same timing circuit. FIG. 10 also illustrates timing diagrams of a clock signal 1006 for the arithmetic logic circuit 804 and the photosensor 802, along with a clock signal 1008 for the buffer 1002 and the memory block 1004. Each aggregation of photon count from the ALU 804 corresponds to a single write operation to the buffer 1002, which in turn corresponds to a single write operation to the memory block 1004. Therefore, this configuration may be clocked as fast as the slowest component in the histogram data path. For example, assuming that the memory block 1004 requires the most time between operations, each component in the data path in FIG. 10 may be clocked at the same speed as the memory block 1004.

B. Single-Pixel, Multiple-Time-Bin Memories

Figure 11:
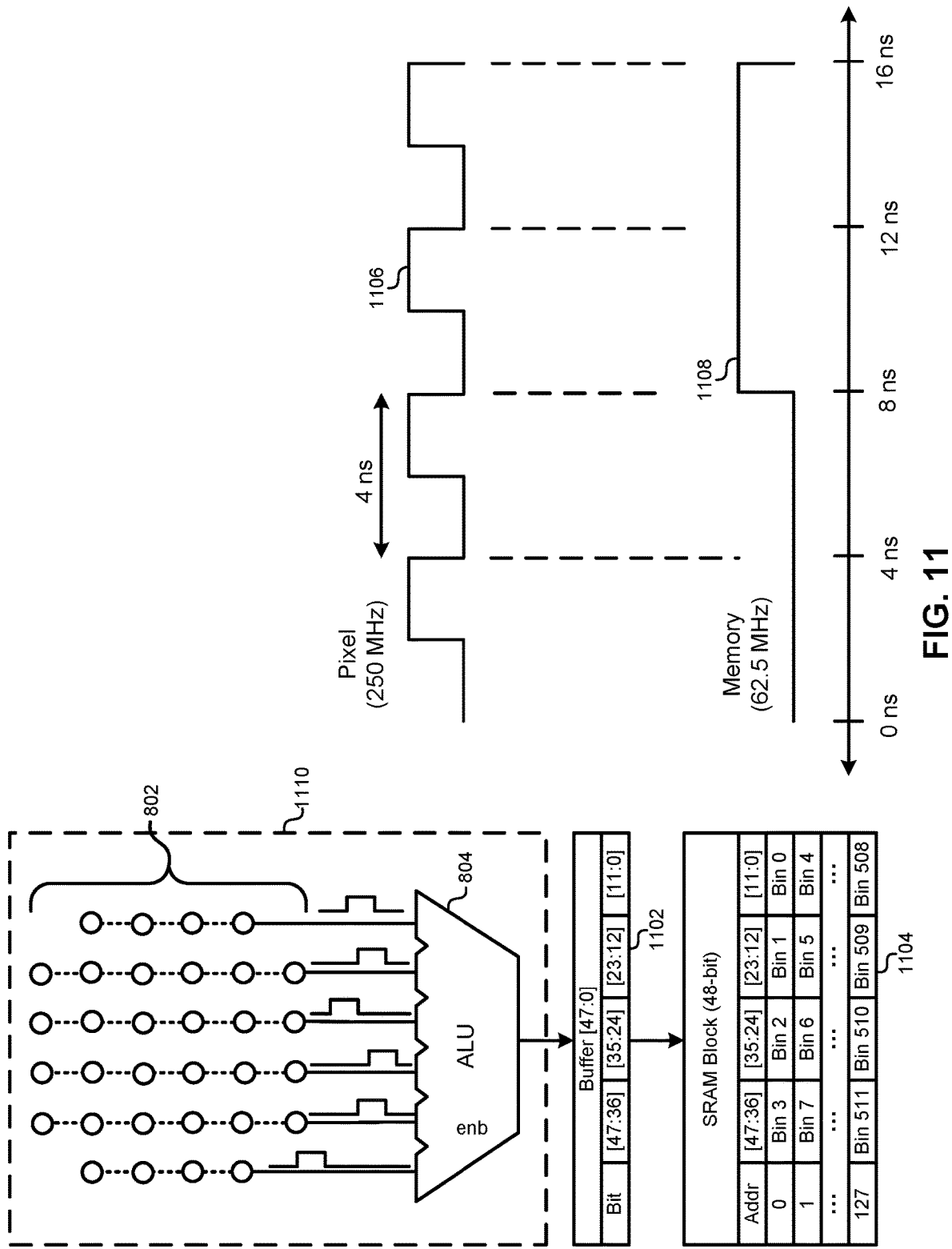
FIG. 11 illustrates a histogram data path with a buffer that is subdivided to represent multiple time bins, according to some embodiments.

FIG. 11 illustrates a histogram data path with a buffer 1102 that is subdivided to represent multiple time bins, according to some embodiments. In contrast to the buffer 1002 in FIG. 10, the buffer 1102 in FIG. 11 is configured to receive photon counts from the photosensor 802 during multiple time bins. In this example, the size of the buffer 1102 may also be increased. Instead of being 12 bits wide, the buffer 1102 may be increased to be 48 bits wide. This example is not meant to be limiting. Other embodiments need not increase the size of the buffer 1102, but may instead subdivide the existing size of the buffer into multiple section, or registers, each representing a time bin. In this example, each time bin is still represented by 12 bits, and thus the buffer 1102 may represent four time bins in a total of 48 bits, with each time bin being 12 bits wide.

The buffer 1102 may represent multiple time bins by sequentially receiving photon counts from the arithmetic logic circuit 804 that are then stored into each sequential subdivision of the buffer 1102. For example, for a first time bin, the arithmetic logic circuit 804 may store its result in the first 12 bits (bits [11:0]) of the buffer 1102. For a second time bin, the arithmetic logic circuit 804 may store its result in the second 12 bits (bits [23:12]) of the buffer 1102. During a third time bin, the arithmetic logic circuit 804 may store its result in the third 12 bits (bits [35:24]) of the buffer 1102. And, during a fourth time bin, the arithmetic logic circuit 804 may store its result in the fourth 12 bits (bits [47:36]) of the buffer 1102. As described below, switching circuitry may be used to route the results from the arithmetic logic circuit 804 into the proper bit ranges of the buffer 1102.

When the four time bins in the buffer 1102 have been populated by the arithmetic logic circuit 804, the contents of the buffer 1102 can be written to the memory block 1104. In this example, the memory block 1104 may have a width that is increased to match the width of the buffer 1102. Therefore, a single write operation can transfer the contents of the buffer 1102 into a single row of the memory block 1104. As illustrated in FIG. 11, each row in the memory block 1104 may represent four consecutive time bins for the photosensor 802. As illustrated in FIG. 11, each row in the memory block 1104 may include a number of bits (e.g., 48 bits) corresponding to the number of bits in the buffer 1102. These bits may be subdivided into a plurality of "registers," each of which represents a single time bin for a corresponding photosensor. In some embodiments, the individual registers in the memory block 1104 may be individually addressable such that, for example, the optical measurement system can write to an individual register (e.g., row 0, bits [23:12]). In some embodiments, the memory block 1104 may read/write entire rows in the memory block 1104.

The number of rows in the memory 1104 may also depend on the size of the buffer 1102 and the desired temporal resolution of the photosensor 802. In this example, the number of rows in the memory block 1104 has been maintained at 128 rows. Therefore, the total number of time bins represented by the memory block 1104 for the photosensor 802 has been quadrupled as the size of the buffer 1102 has been quadrupled. In this example, the memory block 1104 may represent 512 histogram bins rather than 128 histogram bins. Assuming that the length of each shot remains unchanged, this increase in the number of time bins may correspond to an increase in the temporal resolution of the histogram. Consequently, this may lead to an increased spatial resolution when calculating distances to objects in the surrounding environment.

Although not shown explicitly in FIG. 11, some embodiments may increase or decrease the number of rows in the memory block 1104. For example, some embodiments may decrease the number of rows in the memory block 1104 as the number of time bins represented in each row increases. This may be used for shorter shots that still increase the temporal resolution of the histogram. This may also be used to maintain the overall size of the memory block 1104 by increasing the width while decreasing the length accordingly.

FIG. 11 also illustrates a timing diagram for the clock signals that operate the components in this histogram data path. In this example, the arithmetic logic circuit 804 may use a clock signal 1106 that is four times faster than a clock signal 1108 used by the memory block 1104 and/or the buffer 1102. If it is assumed that the clock speed of the memory block 1104 is the same as illustrated in FIG. 10, then the arithmetic logic circuit 804 can be clocked four times faster than it was using a buffer that was only a single time bin wide. Therefore, some embodiments may increase the speed with which the arithmetic logic circuit 804 operates by an amount proportional to the number of time bins represented by the buffer 1102. This also allows the system to increase the temporal resolution of the histogram stored in the memory block 1104 without necessarily increasing the speed with which the memory block 1004 operates.

The operation of the photodetectors in the photosensor 802 and the arithmetic logic circuit 804 is described in detail above. To simplify this disclosure going forward, the combination of the photosensor 802, the arithmetic logic circuit 804, and/or any associated circuitry may be described simply as a "pixel" 1110. Therefore, the following discussion may refer to a pixel 1110 and its relationship with an associated buffer 1102 and/or memory block 1104. The pixel 1110 may include all of the circuitry illustrated in FIG. 11, as well as individual photodetectors (e.g., SPADs), threshold detection circuitry, hold circuitry, circuitry that causes existing time bin values to be added to new photon count, and so forth.

Figure 12:
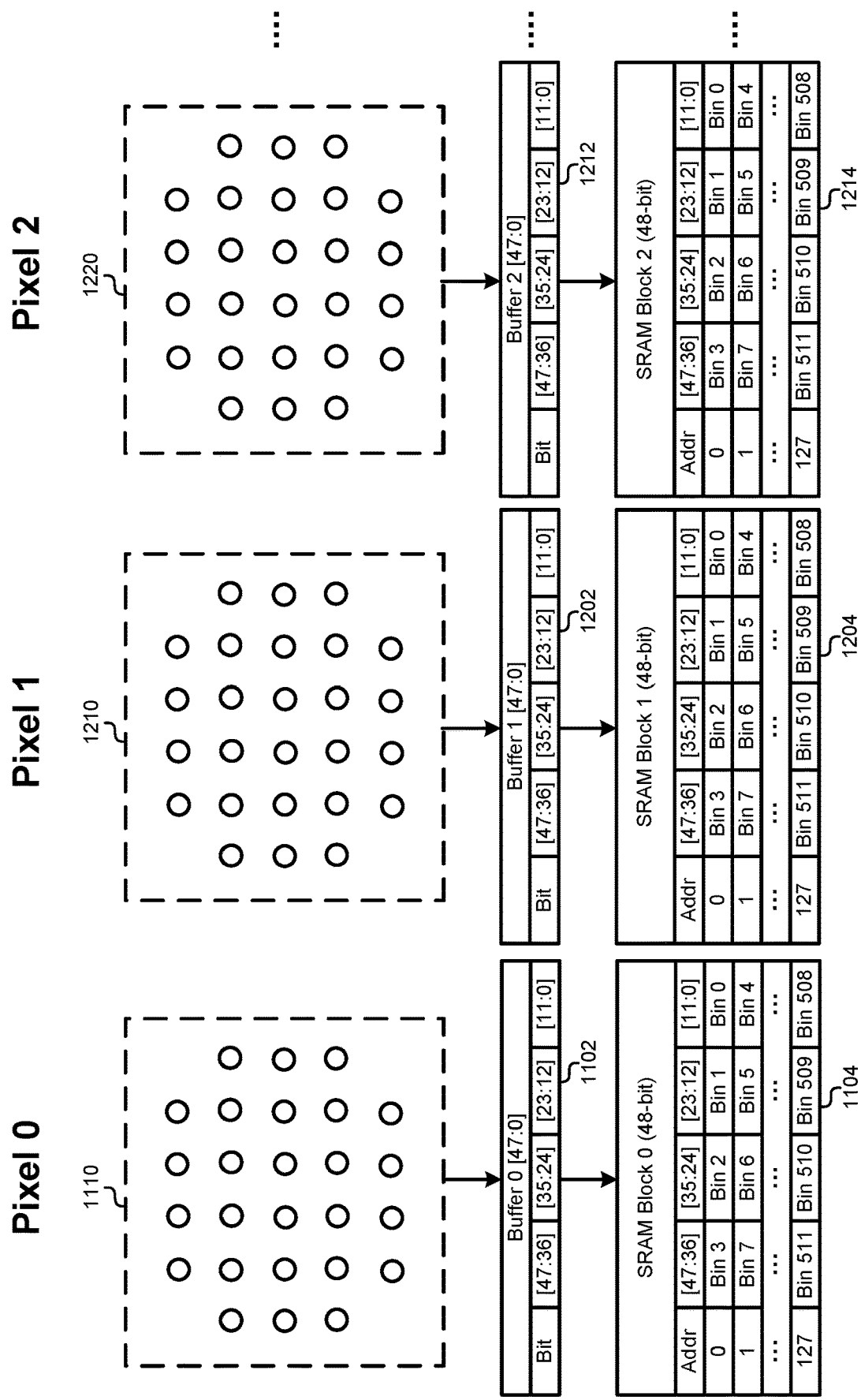
FIG. 12 illustrates an array of multiple pixels, each of which writes to a single memory block, according to some embodiments.

FIG. 12 illustrates an array of multiple pixels, each of which writes to a single memory block, according to some embodiments. The optical measurement system may include an array of multiple pixels, each of which may be tied to a corresponding buffer and a corresponding memory block. In some embodiments, buffers that are only a single time bin wide as depicted in FIG. 10 may be used for each pixel. In the example of FIG. 12, each pixel 1110, 1210, 1220 may be connected to a corresponding buffer 1102, 1202, 1212 that is multiple time bins wide. Each of these buffers 1102, 1202, 1212 may be coupled with corresponding single memory blocks 1104, 1204, 1214 having widths that correspond to the widths of the buffers 1102, 1202, 1212.

Although this example shows each of the pixels 1010, 1210, 1220 coupled to a single combination of a buffer and a memory block, not all embodiments are so limited. By adjusting the width of the buffers and/or the timing of the clock signal used to operate the buffers, multiple pixels may be routed to a single buffer. In other implementations, a single pixel may be routed to multiple buffers. As will be described below, a determination as to which pixels write to which buffers may be made at design time and/or may be made dynamically at runtime. This allows for many combinations of pixels/buffer pairings and allows the optical measurement system to fine-tune the number of optical channels it provides and/or the temporal resolution provided by each channel.

VI. Multi-Pixel Memory Configurations

Figure 13:
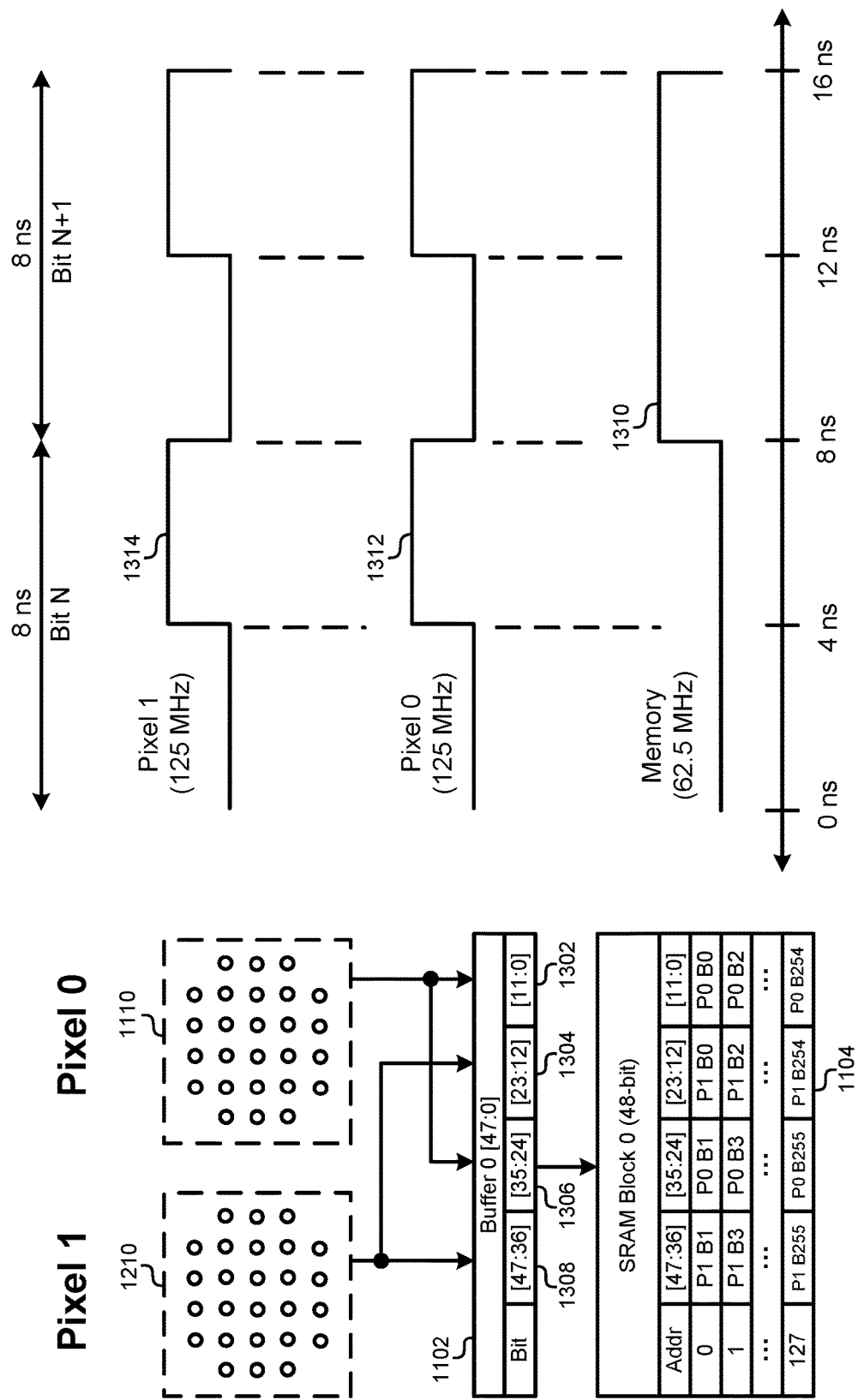
FIG. 13 illustrates a single buffer that receives aggregated photon count from two different pixels, according to some embodiments.

FIG. 13 illustrates a single buffer 1102 that receives aggregated photon count from two different pixels 1110, 1210, according to some embodiments. As described above, the buffer 1102 may be subdivided such that it represents four different time bins, where each of the time bins is 12 bits wide. The number of time bins and/or the number of bits used to represent each time bin may be freely adjusted to use more or fewer bits and/or time bins then is depicted in FIG. 13. Additionally, the overall width of the buffer 1102 may be increased or decreased to accommodate various bin counts and/or widths.

The time bins represented by the buffer 1102 can be split between pixel 1110 and pixel 1210. During a first time bin, both pixel 1110 and pixel 1210 may be simultaneously receiving respective photon counts and aggregating those photon counts using their respective arithmetic logic circuits. The outputs from the pixels 1110, 1210 may be stored in the first two time bins of the buffer 1102. For example, the first time bin from pixel 1110 may be stored in the first 12 bits 1302 of the buffer 1102, while the first time bin from pixel 1210 may be stored in the second 12 bits 1304 of the buffer 1102. After the first time bin for each of the pixels 1110, 1210 have been written to the buffer 1102, switching circuitry may reroute the outputs of the pixels 1110, 1210 to the next two time bins in the buffer 1102. For example, the second time bin from pixel 1110 may be stored in the third 12 bits 1306 of the buffer 1102, while the second time bin from pixel 1210 may be stored in the fourth 12 bits 1308 of the buffer 1102.

When the buffer 1102 becomes full, the memory block 1104 corresponding to the buffer 1102 can perform a write operation to store the contents of the buffer 1102 into a single row of the memory block 1104. FIG. 13 illustrates how time bins from pixels can be stored throughout the memory block. For example, the "0" row of the memory block 1104 may store the first time bin from pixel 1110 (P0 B0), the first time bin from pixel 1210 (P1 B0), the second time bin from pixel 1110 (P0 B1), and the second time bin from pixel 1210 (P1 B1). Therefore, if the number of rows in the memory block 1104 is not increased, sharing a single memory block 1104 between multiple pixels may reduce the number of time bins that may be represented by the memory block 1104. For example, instead of representing 512 time bins for each pixel in FIG. 11, the implementation of FIG. 13 may represent 256 time bins for each pixel. Other embodiments may increase the size of the memory block 1104 to maintain the previous number of bins for each pixel.

Note that in comparison to the example of FIG. 11, the structure of the buffer 1102 and the structure of the memory block 1104 need not change. The only change depicted is that multiple pixels 1110, 1210 write to the buffer 1102 instead of only a single pixel 1110. Therefore, switching between a single pixel writing to a single buffer and multiple pixels writing to the single buffer may be accomplished by switching circuitry between the pixels 1110, 1210 and the buffer 1102 as described in greater detail below.

FIG. 13 also illustrates a timing diagram for the clock signals associated with each of the pixels and the memory buffer/block. In this example, the clock signal 1314 for pixel 1210 may be in phase with a clock signal 1312 for pixel 1210. Therefore, pixel 1110 and pixel 1210 may be clocked using a same shared clock signal. Additionally, clock signal 1314 and clock signal 1312 may have a frequency that is twice as fast as clock signal 1310 for the buffer 1102 and the memory block 1104. Therefore, the pixels 1110, 1210 may be clocked twice as fast as the memory block 1104 in this configuration.

Figure 14:
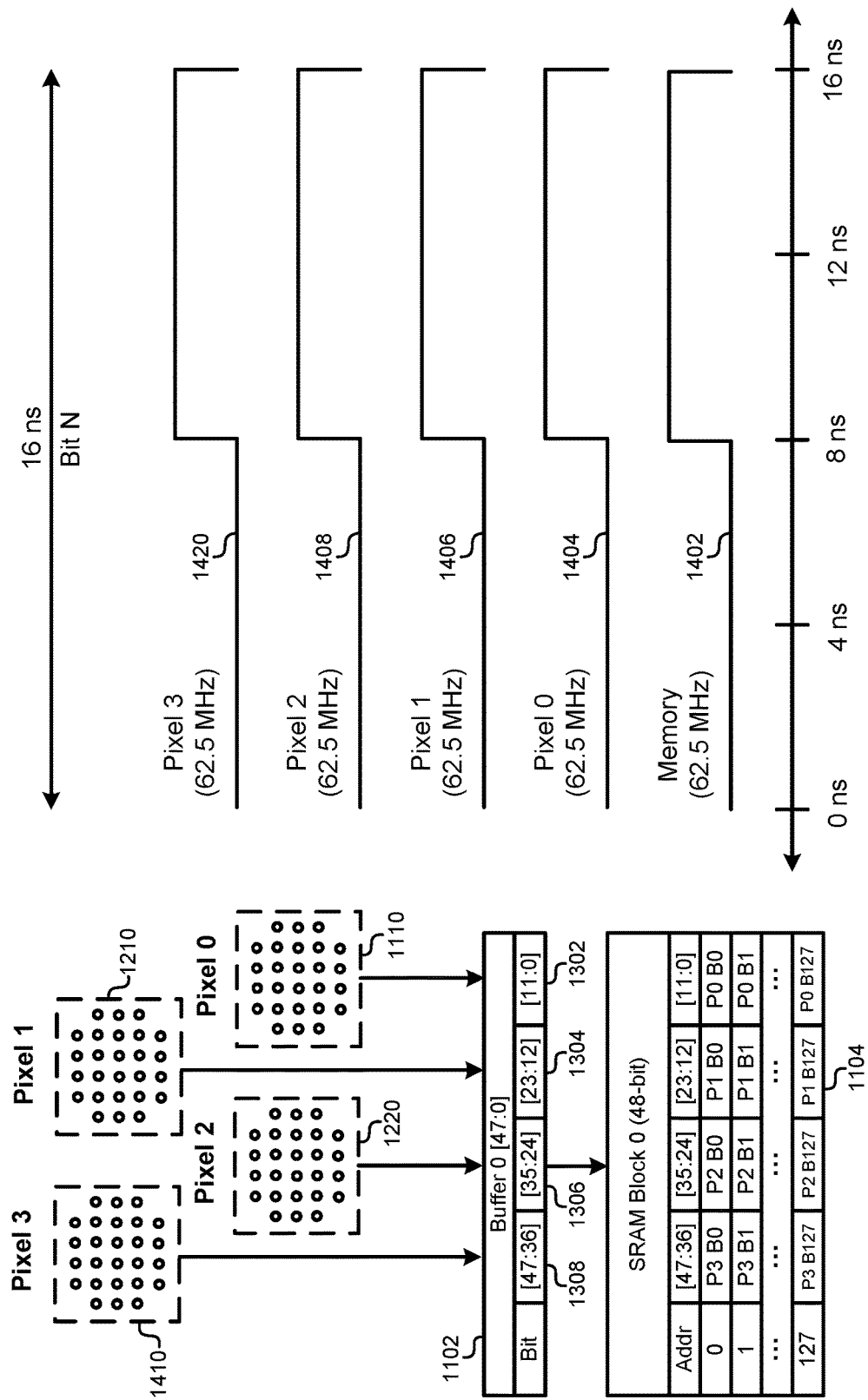
FIG. 14 illustrates a single buffer that receives aggregated photon counts from four different pixels, according to some embodiments.

FIG. 14 illustrates a single buffer 1102 that receives aggregated photon counts from four different pixels 1110, 1210, 1220,1410 according to some embodiments. In this example, each of four different pixels 1110, 1210, 1220, 1410 may all simultaneously write to individual subdivisions of the buffer 1102 during each time bin. The first 12 bits 1302 of the buffer 1102 may receive a photon count from pixel 1110 during each time bin. Similarly, the second 12 bits 1304 of the buffer 1102 may receive a photon count from pixel 1210 during each time bin, and so forth. Therefore, at the end of each time bin, the buffer 1102 may be completely populated with photon counts from each of the pixels 1110, 1210, 1220, 1410.

The number of pixels that may share a single buffer 1102 and/or memory block 1104 may be determined based on a number of subdivisions in the buffer 1102. For example, by increasing the number of subdivisions in the buffer 1102 to be six instead of four, the buffer 1102 could accommodate up to six different pixels. As described above, the number of subdivisions may be increased by decreasing the bin size and/or increasing the width of the buffer 1102 along with each row in the memory block 1104. Increasing the number of pixels coupled to a buffer 1102 and memory block 1104 may decrease the number of bins that may be represented for each pixel in the memory block 1104. For example, when using four pixels as illustrated in FIG. 14, the number of time bins for each pixel has decreased to 128 time bins.

FIG. 14 also illustrates a timing diagram for each of the clock signals used by the various pixels and memory components. The four clock signals 1404, 1406, 1408, 1420 correspond to each of the four pixels 1110, 1210, 1220, 1410 respectively. Each of these clock signals may share the same frequency and phase such that each of the pixels 1110, 1210, 1220, 1410 may be clocked using the same clock source. Because the buffer 1102 is populated at the conclusion of each time bin, a clock signal 1402 for the buffer 1102 and/or the memory block 1104 may be the same as the clock signals 1404, 1406, 1408, 1420 for the four pixels 1110, 1210, 1220, 1410. Therefore, when the number of pixels matches the number of subdivisions in the buffer 1102, the memory block 1104 may operate at the same clock speed as the pixels 1110, 1210, 1220, 1410. While the speed at which each of the pixels 1010, 1210, 1220, 1410 may be sampled decreases relative to the example of FIG. 13, the total size of the memory storing the histogram for these pixels may also decrease because a single memory block 1104 can accommodate an increased number of pixels. This may be advantageous for saving space on an integrated circuit for the optical measurement system.

VII. Memory Configuration Circuitry

The example configurations illustrated above show various ways in which one or more pixels may be connected to a single buffer and/or memory block. These examples include a single pixel, two pixels, four pixels, etc., connected to the same buffer. The explanation above also describes in a general sense how other pixel count may also be connected to a single buffer other than those specifically illustrated. These various configurations may use different clock signals for each component connected to a buffer. These various configurations may also be selected statically or dynamically such that multiple operating configurations are possible for the optical measurement system during operation. The following sections illustrate and describe circuitry that may be used to generate clock signals and select signals to switch between the different configurations described above.

A. Memory Selection Circuit

Figure 15:
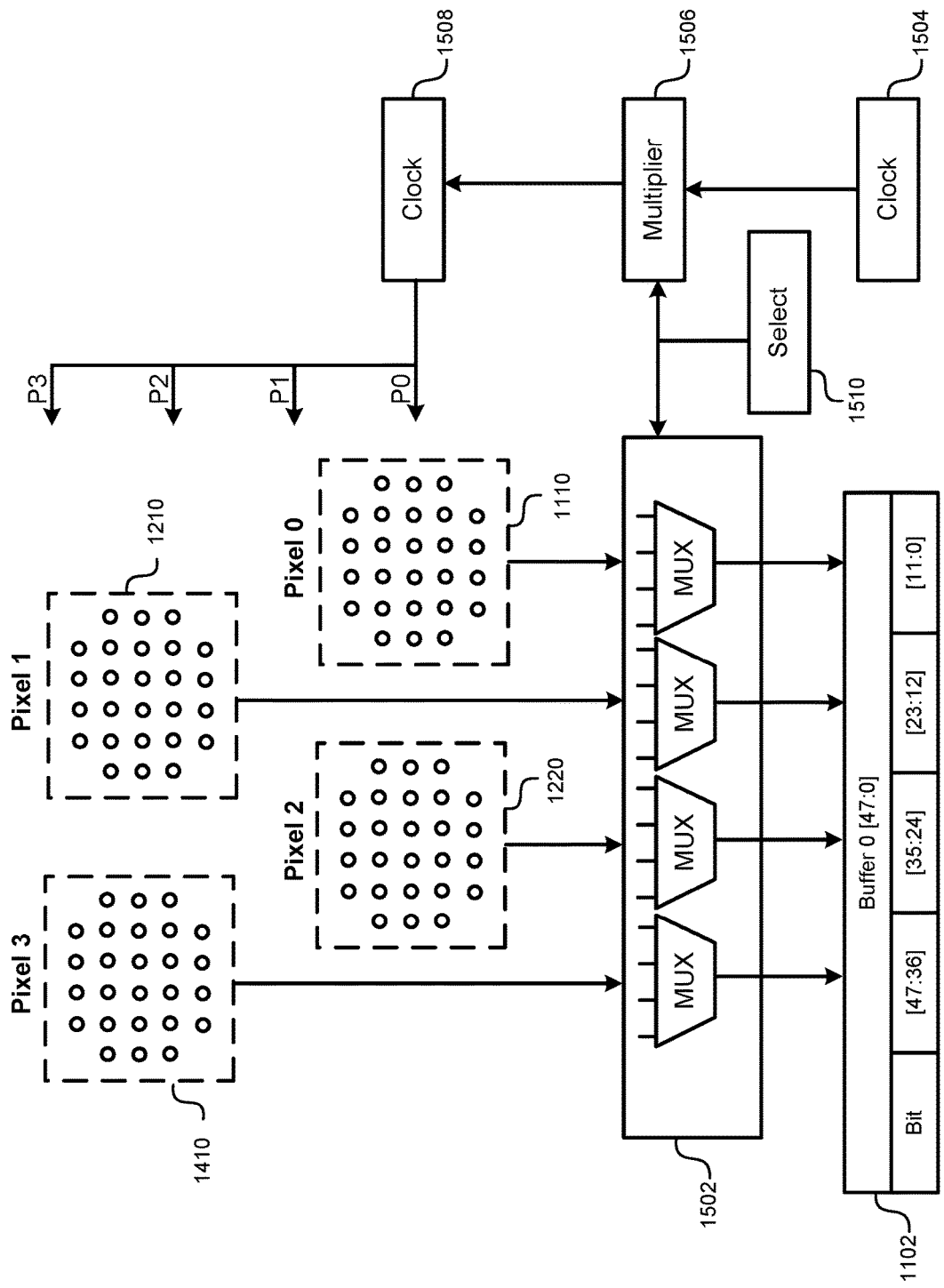
FIG. 15 illustrates a select circuit for implementations where multiple pixels are coupled with a single memory block, according to some embodiments.

FIG. 15 illustrates a select circuit 1502 for implementations where multiple pixels are coupled with a single memory block, according to some embodiments. The select circuit 1502 may be represented by a plurality of multiplexers. In this example, each of the multiplexers in the select circuit 1502 may include a number of inputs matching the number of pixels connected to the select circuit 1502. Each of the inputs on the multiplexers may be coupled to one of the four pixels 1110, 1210, 1220, 1410 illustrated in FIG. 15. The select circuit 1502 may receive a select signal 1510 that selects inputs for each of the multiplexers in the select circuit 1502. Although illustrated as a single signal in FIG. 15, the select signal 1510 may include one or more select signals for each of the multiplexers in the select circuit 1502.

The select signal 1510 may include a number of different possible configurations. In one configuration, the select signal 1510 may cause each of the multiplexers to select an input corresponding to pixel 1110 such that each of the time bins in the buffer 1102 receive photon counts from pixel 1110 in successive time bins. In another configuration, the select signal 1510 may cause two of the multiplexers to select pixel 1110 while also causing two of the multiplexers to select pixel 1210. This may correspond to the configuration illustrated in FIG. 13. Similarly, the select signal 1510 may cause each of the multiplexers in the select circuit 1502 to select one of the pixels 1110, 1210, 1220, 1410 to correspond to the configuration of FIG. 14 where the buffer 1102 is populated during a single time bin by four different pixels. The select signal 1510 may be generated by control logic, such as a state machine implemented in an FPGA or other programmable logic. The select signal 1510 may also be generated by a processor or microcontroller that allows the configuration of the pixel-to-memory mapping to be dynamically changed at runtime or during operation.

A clock signal 1504 may provide a baseline clock signal for the buffer 1102 and/or the associated memory block. The clock signal 1504 may be set at a speed that is within the operating parameters of the memory block, and may be set to a maximum speed for the memory block. The clock signal 1504 may also be provided to a multiplier circuit 1506. The multiplier circuit 1506 may use the select signal 1510 to determine how the clock signal 1504 should be multiplied for each of the pixels. For example, when the select signal 1510 causes the select circuit 1502 to write values from all of the pixels 1110, 1210, 1220, 1410, the multiplier circuit 1506 may multiply the clock signal 1504 such that it provides a clock signal 1508 to each of the pixels 1110, 1210, 1220, 1410 that is substantially the same as the clock signal 1504. In contrast, when the select signal 1510 causes the select circuit 1502 to select only pixel 1110 to write to the buffer 1102, then the multiplier circuit 1506 can multiply the clock signal 1504 such that the output clock signal 1508 as four times the frequency of the clock signal 1504.

Although not shown explicitly in FIG. 15, the multiplied clock signal 1508 may also be used by the buffer 1102 to clock in new values as they are received from the corresponding pixels. In some embodiments, each of the individual subdivisions of the buffer 1102 may be clocked separately along with each of the pixels. For example, when two pixels write to the buffer 1102, the first subdivisions may be clocked together in the buffer 1102, and the second subdivisions may be clocked together in the buffer 1102 during subsequent time bins.

FIG. 15 only illustrates four pixels 1110, 1210, 1220, 1410 and a single buffer 1102 in the optical measurement system. However, as described above, the optical measurement system may include a relatively large number of pixels compared to what is shown in FIG. 15. For example, an optical measurement system may include 256 pixels in an array. In such an array, each pixel may be coupled to its own buffer along with a variable number of buffers associated with adjacent pixels. For example, pixel 1410 in FIG. 15 may be coupled to buffer 1102 belonging to pixel 1010, but may also be coupled to separate buffers corresponding to pixel 1210, pixel 2020, and other pixels not specifically illustrated in FIG. 15. Therefore, FIG. 15 should be understood to represent only a small portion of the overall optical measurement system.

B. Configuration Selection Circuit

Figure 16:
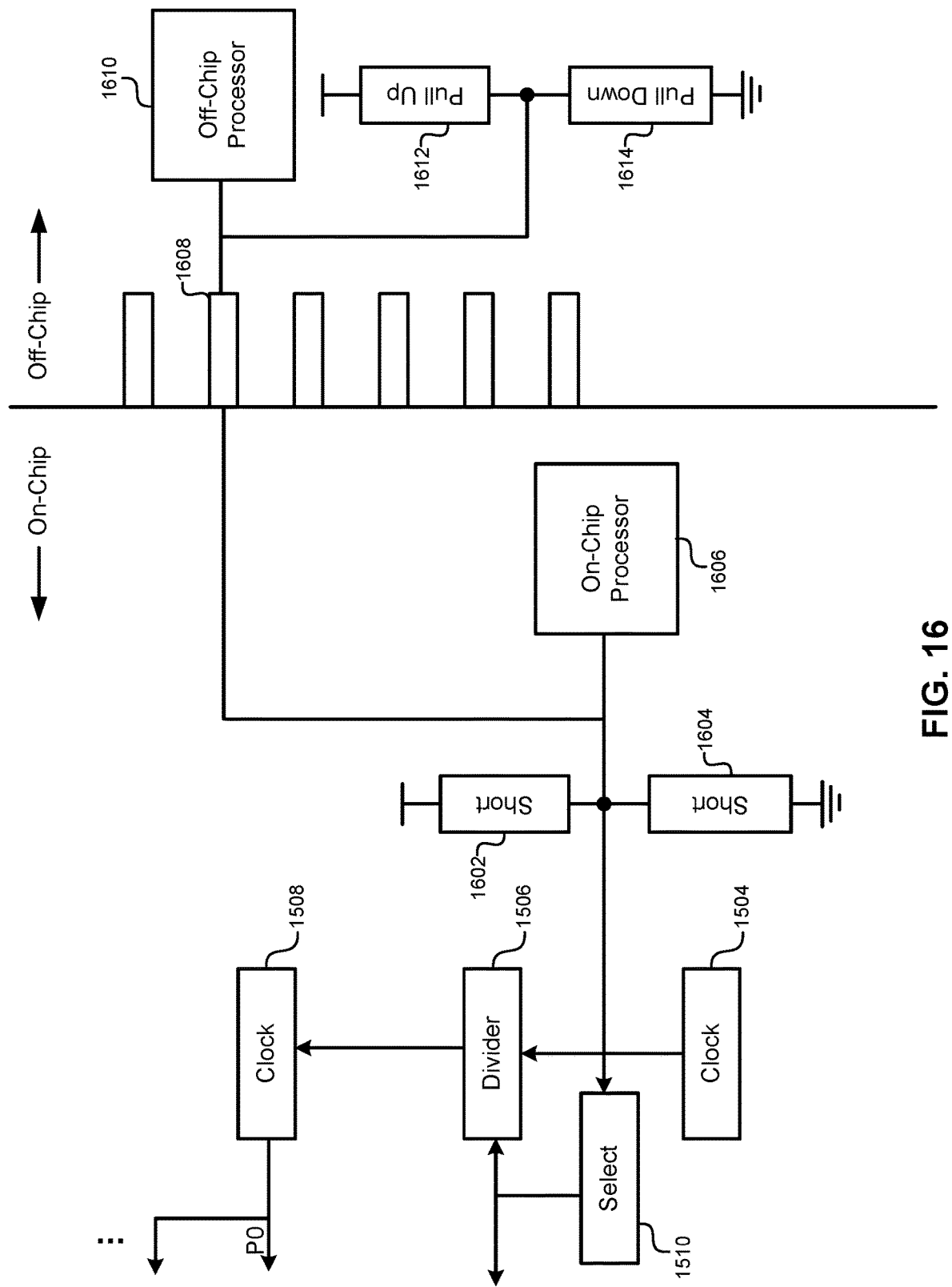
FIG. 16 illustrates circuits for providing the select signal using on-chip and/or off-chip options, according to some embodiments.

FIG. 16 illustrates circuits for providing the select signal 1510 using on-chip and/or off-chip options, according to some embodiments. Although FIG. 16 represents a number of different options for generating the select signal 1510, not all of these options are necessary in various implantations. Various embodiments may use any and/or all of these different options for generating the select signal 1510 in any combination and without limitation.

In some embodiments, the select signal 1510 may be generated when the optical measurement system is designed and/or manufactured. For example, the number of pixels and/or time bins represented by each buffer and memory block may be chosen at design time. Connections 1602, 1604 may be placed in the circuit that pull the select signal 1510 to either a logic 0 or a logic 1, depending on the components selected for connections 1602, 1604. For example, if connection 1602 comprises a short circuit or low-resistance path to power, and connection 1604 is left is an open circuit or relatively high resistance path to ground, the select signal 1510 may receive a logic 1 from the circuit board. Reversing these open/short connections may instead provide a logic 0 to the select signal 1510. These connections may be implemented with actual short/open circuits, transistors that may be controlled by a processor, a voltage or capacitive divider circuit, and/or other discrete circuit elements. Circuit values (e.g., resistances) may be selected such that they provide a default logic value for the select signal 1510 that can be overridden by a stronger input. Once the chip is fabricated, the memory and pixel configuration may be static. Again, although the select signal 1510 is represented as only a single signal in FIG. 16 for clarity, the select signal 1510 may be implemented using multiple signals, each corresponding to a particular clock signal and/or multiplexor in the select circuit.

In some embodiments, the optical measurement system may include an on-chip processor 1606 that is implemented on the same chip as the buffer and the memory block. The on-chip processor 1606 may generate signals (e.g., logic 0's or logic 1's) that control the memory configuration for the optical measurement system. This solution may be combined with the connections 1602, 1604 described above, where the connections 1602, 1604 act as default values with relatively weak pull-up/-down transistors/resistors that can be overridden by a signal generated by the on-chip processor 1606. The on-chip processor 1606 allows the system to dynamically control the memory configuration at runtime. For example, each mode discussed above in FIGS. 11-15 may be selected by the on-chip processor 1606. The different select signals may be used to operate the multiplexers described in FIG. 15 and route specific pixel outputs to specific buffers corresponding to each mode.

Some embodiments may also use various off-chip circuits to generate the select signal 1510. In a manner similar to how the connections 1602, 1604 pull up/down the select signal 1510, a pair of connections 1612, 1614 can also be used off-chip to perform a similar function. For example, resistors/transistors may be added to a circuit board on which the optical measurement system chip is mounted, and these resistors/transistors may provide an input to a pin 1608 on the chip that is provided as the select signal 1510. The signal provided on the pin 1608 may also be provided to the on-chip processor 1606, which can in turn generate the select signal 1510. In some embodiments, an off-chip processor 1610 may also be used to generate the select signal 1510 while the optical measurement system is operating such that the select signal 1510 may be generated dynamically at runtime.

VIII. Method for Operating Multiple Pixels Per Memory Block

Figure 17:
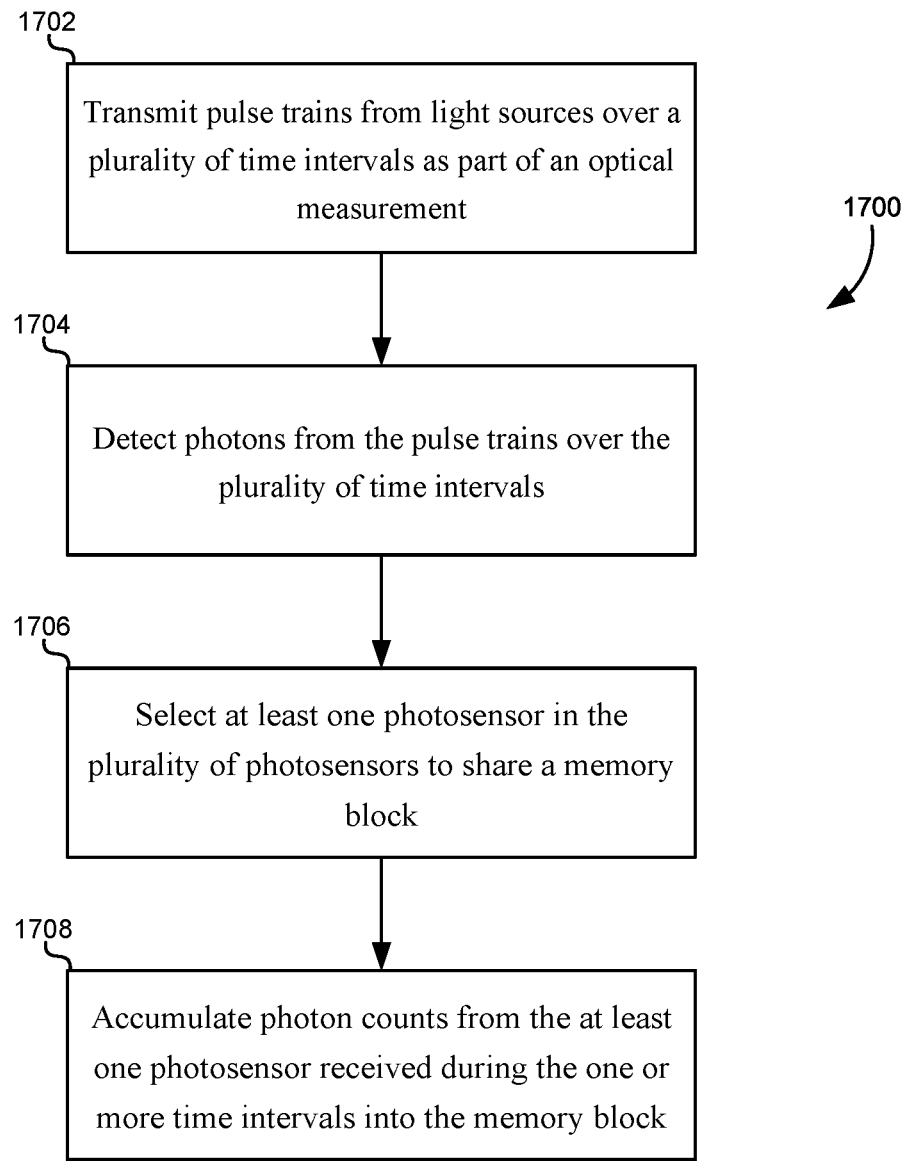
FIG. 17 illustrates a flowchart of a method for using an optical measurement system where one or more pixels may write to a single buffer and into a single memory block.

FIG. 17 illustrates a flowchart 1700 of a method for using an optical measurement system where one or more pixels may write to a single buffer and into a single memory block. This method may select one or more photo sensors such that their outputs are stored in the single memory block. This allows the optical measurement system to dynamically configure how many photo sensors write to each memory block, ranging from a single photosensor (e.g., FIG. 11) to multiple photo sensors (e.g., FIG. 14). This method may be applied to a single memory block in the optical measurement system. As described above, the optical measurement system may include many additional memory blocks that are not specifically referenced in this method, but which also receive photosensor outputs. Therefore, when the memory block referenced below receives outputs from multiple photo sensors, other memory blocks in the optical measurement system may be turned off or otherwise left idle. This method may be carried out for each memory block in the optical measurement system.

At step 1702, the method may include transmitting one or more pulse trains from a plurality of light sources over one or more first time intervals as a part of an optical measurement. Each of the one or more first time intervals may represent a "shot" that is repeated multiple times in the measurement. Each of the first time intervals may include one or more pulse trains that are encoded and transmitted by the light sources such that the pulse trains can be recognized as they are reflected off of objects in the surrounding environment. Each of the time intervals may be subdivided into a plurality of time bins such that each of the time bins represents a bin in a histogram of aggregated photon counts during the optical measurement. An example of how a single measurement may include multiple shots subdivided into time bins that aggregate photon counts is described above in relation to FIG. 9.

At step 1704, the method may also include detecting photons from the one or more pulse trains using one or more photosensors. As described above, each of the photosensors may include a plurality of photodetectors, such as a plurality of SPADs. Each of the photosensors may receive reflected light as well as ambient background noise received from the surrounding environment. The photosensors may also be coupled to threshold detection circuits, as well as arithmetic logic circuits that accumulate photon counts. This combination may be referred to above as a "pixel." FIG. 5 illustrates an example of how photon counts may be received from photosensors and counted using threshold circuitry and pixel counters (e.g., arithmetic logic circuits).

At step 1706, the method may also include selecting at least one photosensor in the plurality of photosensors to share a memory block. In some embodiments, a select signal may be provided that causes one or more multiplexers to select the at least one photosensor and route the outputs from the at least one photosensor to a single memory block in a plurality of memory blocks. Selecting more than one photosensor to share a memory block may cause other memory blocks to remain idle. Using the select signal, the at least one photosensor that is selected may include a single photosensor, two photosensors, three photosensors, four or more photosensors, and so forth. Selecting more than one photosensor to share the memory block may cause a clock signal used by the photosensors to be reduced. Photosensors may be selected using, for example, any of the techniques described above in relation to FIG. 15 and FIG. 16.

At step 1708, the method may additionally include accumulating photon counts from the at least one photosensor received during the one or more time intervals into the shared memory block. In some embodiments, the accumulated photon counts may first be stored in a memory buffer that is the same width as a read/write port on the memory block. The memory buffer may be subdivided into one or more sections, or individual registers or subdivisions representing time bins that can be sequentially filled by the selected photosensor(s). For example, the buffer 1102 is subdivided into four sections in FIG. 11. The buffer may store accumulated photon counts from multiple photosensors over multiple time bins in each of the sections of the buffer and/or in separate registers or sections of a row in the memory block. The memory buffer may store its contents in the memory block when the buffer is full. The memory block may include a plurality of registers, and each of the registers may correspond to a single photosensor and a single time bin such that the memory block represents a histogram for each of the selected photosensors that share the memory block. In some embodiments, sharing the memory block between multiple photosensors may cause the number of time bins in any histograms represented by the memory block to be reduced. Photon counts from time bins may be stored in rows of the memory block as illustrated above in FIGS. 11-14.

It should be appreciated that the specific steps illustrated in FIG. 17 provide particular methods of using optical measurement system according to various embodiments. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

IX. Multiple-Memory Blocks Per Pixel

The configurations described above allow the optical measurement system to store photon counts from one or more pixels in a single memory block. A single memory block may accommodate multiple pixels by using a buffer between the pixels and the memory block itself. However, providing a buffer between the pixels in the memory block not only allows multiple pixels to be written to a single memory block, it also allows a single pixel to be written to multiple memory blocks. The configurations described below illustrate a number of examples of how memory blocks can store time bins in one or more memory blocks to increase the clock speed of the pixel.

A. Half-Channel Configurations

FIG. 18 illustrates how a single pixel 1110 may write to multiple buffers and multiple memory blocks, according to some embodiments. In this example, the pixel 1110 may be communicatively coupled with the buffer 1102 and the memory block 1104 described above. The buffer 1102 and the memory block 1104 may be wide enough to represent four time bins using 12 bits for each time bin. In the single-pixel, single-memory block configuration described above in FIG. 11, the pixel 1110 may write four time bins to the buffer 1102 using a clock with four times the frequency of the memory clock, and the buffer 1102 may write to the memory block 1104 after every four time bins.

In this configuration, the pixel 1110 may also be communicatively coupled to a second buffer 1802 and a second memory block 1804. The second buffer 1802 may be similar to the first buffer 1102 in that it is 48 bits wide and subdivided into four time bins. Although not shown explicitly in FIG. 18, buffer 1802 may also be connected to another pixel. Therefore, operating in a first configuration, pixel 1110 may operate receiving inputs only from buffer 1102, while buffer 1802 may operate only receiving inputs from another pixel (not shown). When operating in the second configuration illustrated in FIG. 18, pixel 1110 may be connected to both buffer 1102 and buffer 1802, while the other pixel may be turned off. Therefore, when sharing memories between a single pixel, some embodiments may turn off half of the pixels in the pixel array so as to allow other pixels to use their memory blocks. This may have the effect of reducing the number of channels available on the optical measurement system. For example, an optical measurement system with 256 pixel channels may operate in a first mode where all 256 channels are active, each with their own memory block. The same optical measurement system may operate in a second mode where only 128 of the channels are active, each using two memory blocks. Similarly, the optical measurement system may operate in a third mode where only 64 of the channels are active, each using four memory blocks. These different operating modes may be referred to as a full-channel mode, a half-channel mode, and a quarter-channel mode, respectively.

When operating in half-channel mode, the pixel 1110 may write values for the first four time bins in a shot into buffer 1102. When buffer 1102 is full, memory block 1104 may write the contents of the buffer 1102 to the first row of the memory block 1104 (e.g., B0, B1, B2, B3). Next, the pixel 1110 may store the next four time bins of the shot into buffer 1802. When the buffer 1802 is full, memory block 1804 may write the contents of the buffer 1802 to the first row of the memory block 1804 (e.g., B4, B5, B6 B7). Continuing on, the pixel 1110 may alternate writing time bin values to each of the buffers after every fourth time bin. As described above, the use of 48-bit buffers and four time bins in each buffer is used only by way of example. More generally speaking, the pixel 1110 may switch between buffers when it has written a maximum number of time bins represented by the buffers.

Although the number of active channels on the optical measurement system may be reduced, the number of time bins that may be written during a single shot may be increased in half-channel mode. In this example, instead of writing 512 time bins to a single memory block, the pixel 1110 can write 1024 time bins to the combination of memory block 1104 and memory block 1804. This may also allow the pixel 1110 to be clocked faster than either of the memory blocks 1104, 1804 to increase the temporal resolution of the pixel 1110 when building the histogram in the memories 1104, 1804.

FIG. 18 also illustrates a timing diagram for the pixel 1110 and each of the memories 1104, 1804. Assuming that each of the memories 1104, 1804 are clocked at approximately 62.5 MHz, the clock signal 1814 of the pixel may be clocked at 500 MHz. More generally speaking, the clock signal 1814 of the pixel 1110 may be clocked with a frequency that is eight times faster than the clock signals 1810, 1812 of the memory blocks 1104, 1804. Therefore, although the number of channels may be reduced by half, the clock speed of the pixels may be doubled compared to the full-channel mode illustrated in FIG. 11.

In addition to increasing the speed of the clock signal 1814 of the pixel 1110, the clock signals 1810, 1812 for the memory blocks 1104, 1804 may be adjusted such that they are 180° out of phase relative to each other. In this example, there is a delay of 16 ns between successive write operations for each of the memory blocks 1104, 1804. However, when the pixel 1110 is clocked at 500 MHz, one of the buffers 1102, 1802 may be ready to write every 8 ns. By shifting the clock cycles 100° out of phase with each other, one of the memory blocks 1104, 1804 can be ready to write every 8 ns when their corresponding buffer is full. For example, the pixel 1110 can write four values to buffer 1102 during the first 8 ns of the timing diagram in FIG. 18. At 8 ns, the buffer 1102 can write its contents to memory block 1104. Between 8 ns and 16 ns, the pixel 1100 can then write four time bin values to buffer 1802. At 16 ns, memory block 1104 is not yet ready to write another 48 bits of data. However, memory block 1804 is ready, and it can receive the contents of buffer 1802.

The exact timing used in FIG. 18 is provided merely by way of example, and is not meant to be limiting. Any clock cycle compatible with the memory device may be selected for various embodiments. The relative timing between the various clock signals 1810, 1812, 1814 may be used for any chosen clock frequencies.

B. Quarter-Channel Configurations

Figure 19A:
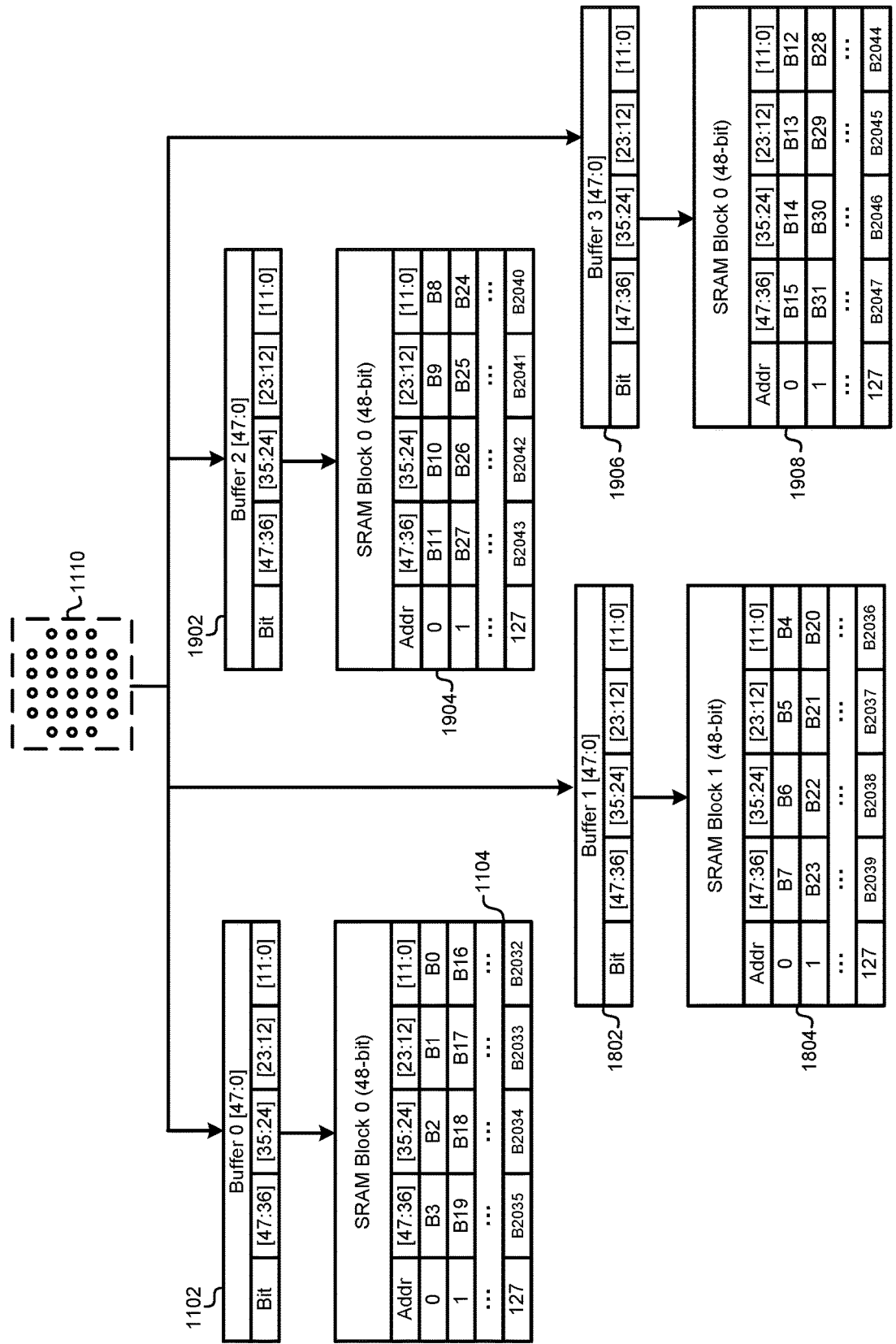
FIG. 19A illustrates a quarter-channel configuration where a single pixel is coupled with four buffers and four memory blocks, according to some embodiments.

FIG. 19A illustrates a quarter-channel configuration where a single pixel 1110 is coupled with four buffers and four memory blocks, according to some embodiments. In this example, a single pixel 1110 may be communicatively coupled to four different buffers 1102, 1802, 1902, 1906. As described above, each of these buffers 1102, 1802, 1902, 1906 may also be assigned to their own individual pixels (not shown). However, in quarter-channel mode, these three other pixels may be turned off such that pixel 1110 can write to all four buffers 1102, 1802, 1902, 1906. This may reduce the number of active channels on the optical measurement system from, for example, 256 down to 64 active channels.

As was the case with the half-channel configuration, the quarter-channel configuration can write values for successive time intervals to each of the buffers individually until they are filled, and then move onto the next buffer in the sequence. For example, the first four time bins (e.g., B0-B3) can be written to buffer 1102, the next four time bins (e.g., B4-B7) can be written to buffer 1802, the next four time bins (e.g., B8-B11) can be written to buffer 1902, and the next four time bins (e.g., B12-B15) can be written to buffer 1906. As each of the buffers 1102, 1802, 1902, 1906 are filled, they can write their contents to their associated memory blocks 1104, 1804, 1904, 1908.

By again doubling the number of memory blocks assigned to pixel 1110, this configuration again effectively doubles the number of time bins that can be stored in a single shot. Instead of storing, for example, 1024 time bins, this configuration may store 2048 time bins for a single shot. This can further increase the temporal resolution of pixel 1110 by further decreasing the time represented by each time bin in a shot.

Figure 19B:
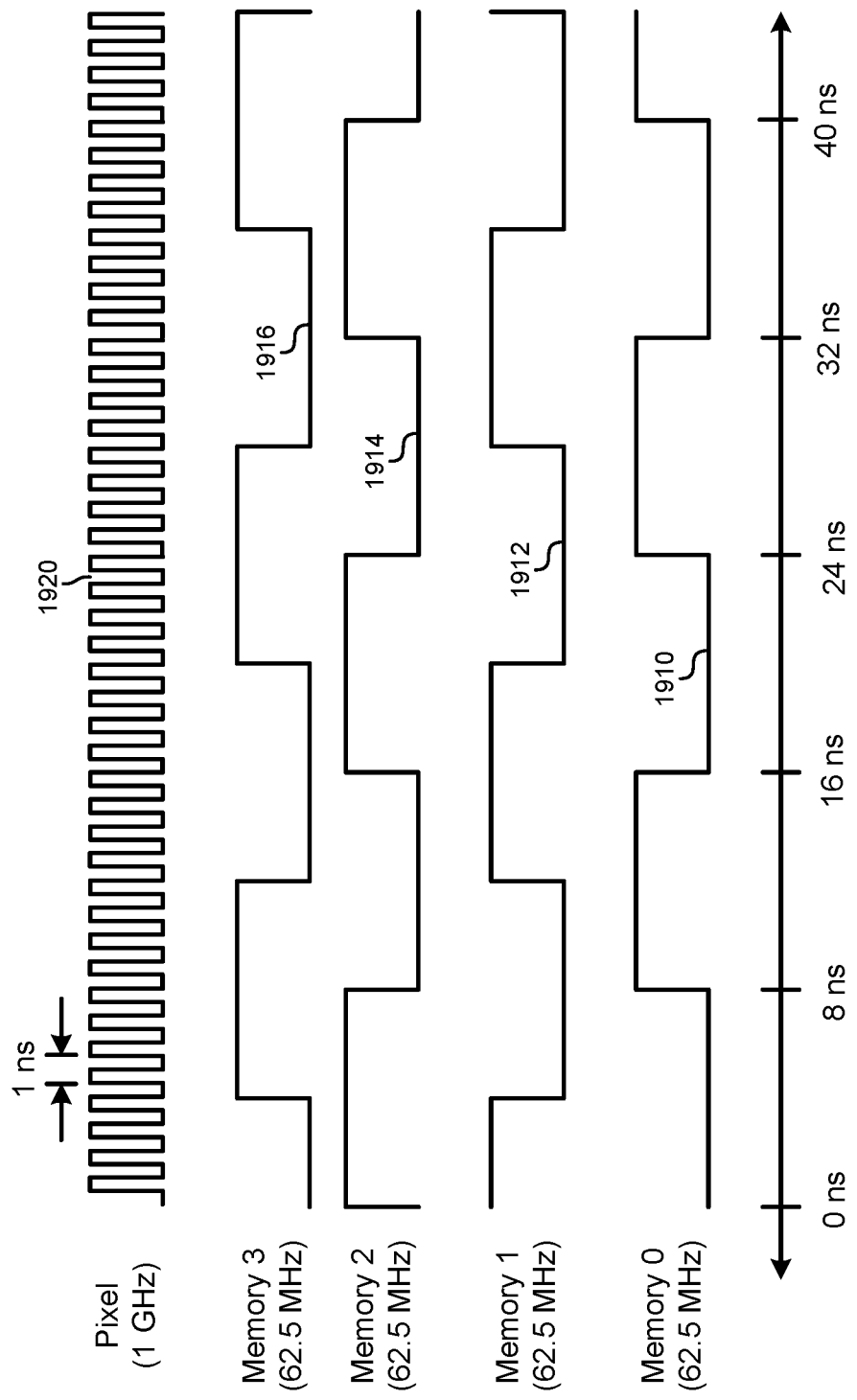
FIG. 19B illustrates a timing diagram for the various clock signals used in the quarter-channel configuration, according to some embodiments.

FIG. 19B illustrates a timing diagram for the various clock signals used in the quarter-channel configuration, according to some embodiments. Continuing with the assumption that each of the memory blocks 1104, 1804, 1904, 1908 operate at 62.5 MHz, the clock speed for pixel 1110 may be increased to 1 GHz. More generally speaking, the frequency of the clock signal 1920 for a pixel in quarter-channel configurations may be 16 times the frequency of the clock signals 1910, 1912, 1914, 1916 of the four associated memory blocks.

When the pixel 1110 is clocked at 1 GHz, one of the buffers 1102, 1802, 1902, 1906 may be filled by the pixel 1110 every 4 ns. Therefore, one of the associated memory blocks 1104, 1804, 1904, 1908 may need to be ready to read in those values every 4 ns. Although each of the clock signals 1910, 1912, 1914, 1916 for the memory blocks may remain at 62.5 MHz, each of these clock signals may be shifted 90° out of phase relative to each other. For example, the clock signal 1910 may cause memory block 1104 to write the contents of buffer 1102 at 8 ns. Next, clock signal 1912 may cause memory block 1804 to write the contents of buffer 1802 at 12 ns. Clock signal 1914 may then cause memory block 1904 to write the contents of buffer 1902 at 12 ns. Clock signal 1916 may next cause memory block 1908 to write the contents of buffer 1906 at 16 ns, and so forth.

X. Memory Configuration Circuitry

Figure 20:
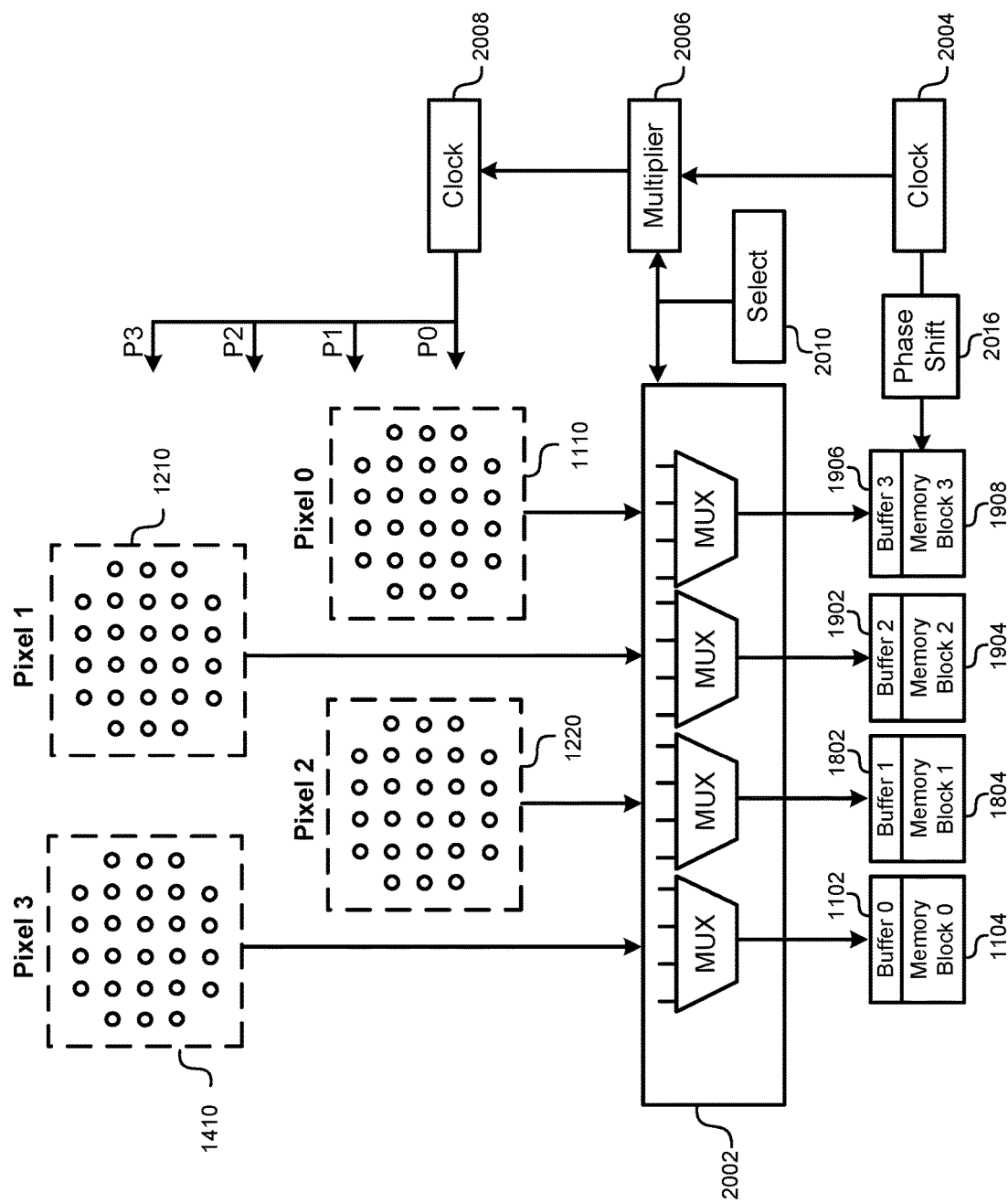
FIG. 20 illustrates a select circuit for implementations where one or more memories may be coupled with a single pixel, according to some embodiments.

FIG. 20 illustrates a select circuit 2002 for implementations where one or more memories may be coupled with a single pixel, according to some embodiments. The select circuit 2002 may be represented by a plurality of multiplexers. In this example, each of the multiplexers in the select circuit 2002 may include multiple inputs, each of which may be coupled to one of the four pixels 1110, 1210, 1220, 1410 illustrated in FIG. 20. The select circuit 2002 may receive a select signal 2010 that selects inputs for each of the multiplexers in the select circuit 2002. Although illustrated as a single signal in FIG. 20, the select signal 2010 may include one or more select signals for each of the multiplexers in the select circuit 2002. Some embodiments may also include multiplexers for each time bin in each of the buffers, resulting in 16 multiplexers in this example.

The select signal 2010 may include a number of different possible configurations. In one configuration, the select signal 2010 may cause each of the multiplexers to select an input corresponding to pixel 1110 such that each of the time bins in the buffer 1102 receive photon counts from pixel 1110 in successive time bins. This configuration may correspond to the quarter-channel mode described above where a single pixel 1110 writes to all four memory blocks 1104, 1804, 1904, 1908. In another configuration, the select signal 2010 may cause two of the multiplexers to select pixel 1110 and may cause two of the multiplexers to select pixel 1210. This may correspond to the half-channel configuration described above where each pixel writes to two memory blocks. Similarly, the select signal 2010 may alternatively cause each of the multiplexers in the select circuit 2002 to select one of the pixels 1110, 1210, 1220, 1410 to correspond to the full-channel configuration described above where each pixel writes to a single memory block.

A clock signal 2004 may provide a baseline clock signal for the each of the buffers 1102, 1802, 1902, 1906 and/or their associated memory blocks 1104, 1804, 1904, 1908. The clock signal 2004 may be set at a speed that is within the operating parameters of the memory block, and may be set to a maximum speed for the memory block, such as 62.5 MHz. This clock signal 2004 may then pass through a phase shifter 2016 for each of the memory blocks such that each memory block receives a version of the clock signal 2004 that is shifted 90° out of phase, 180° out of phase, etc., relative to the adjacent memory blocks, depending on the channel configuration.

The clock signal 2004 may also be provided to a multiplier circuit 2006. The multiplier circuit 2006 may use the select signal 2010 to determine how the clock signal 2004 should be multiplied for each of the pixels. For example, when the select signal 2010 causes the select circuit 2002 to write values from one of the pixels 1110 to all of the memory blocks 1104, 1804, 1904, 1908, the divider circuit 2006 may multiply the clock signal 2004 such that it provides a clock signal 2008 to the pixel 1110 that is, for example, 16 times the frequency of the clock signal 2004.

Although not shown explicitly in FIG. 20, the multiplied signal 2008 may also be used by the buffers 1102, 1802, 1902, 1906 to clock in new values as they are received from the corresponding pixels. In some embodiments, each of the individual subdivisions of the buffer 1102 may be clocked separately along with each of the pixels. For example, when pixel 1110 writes to the buffer 1102, the first subdivision in the buffer 1102 may be clocked with pixel 1110, the second subdivision in the buffer 1102 may be clocked with the next time bin for pixel 1110, and so forth.

FIG. 20 only illustrates four pixels 1110, 1210, 1220, 1410 and four buffers 1102, 1802, 1902, 1906 in the optical measurement system. However, as described above, the optical measurement system may include a relatively large number of pixels compared to what is shown in FIG. 20. For example, an optical measurement system may include 256 pixels in an array. In such an array, each pixel may be coupled to its own buffer along with a variable number of buffers for adjacent pixels. For example, pixel 1410 in FIG. 20 may be coupled to buffer 1102 belonging to pixel 1010, but may also be coupled to separate buffers corresponding to pixels not illustrated in FIG. 20. Therefore, FIG. 20 should be understood to represent only a small portion of the overall optical measurement system.

XI. Method for Operating Multiple Memory Blocks

Figure 21:
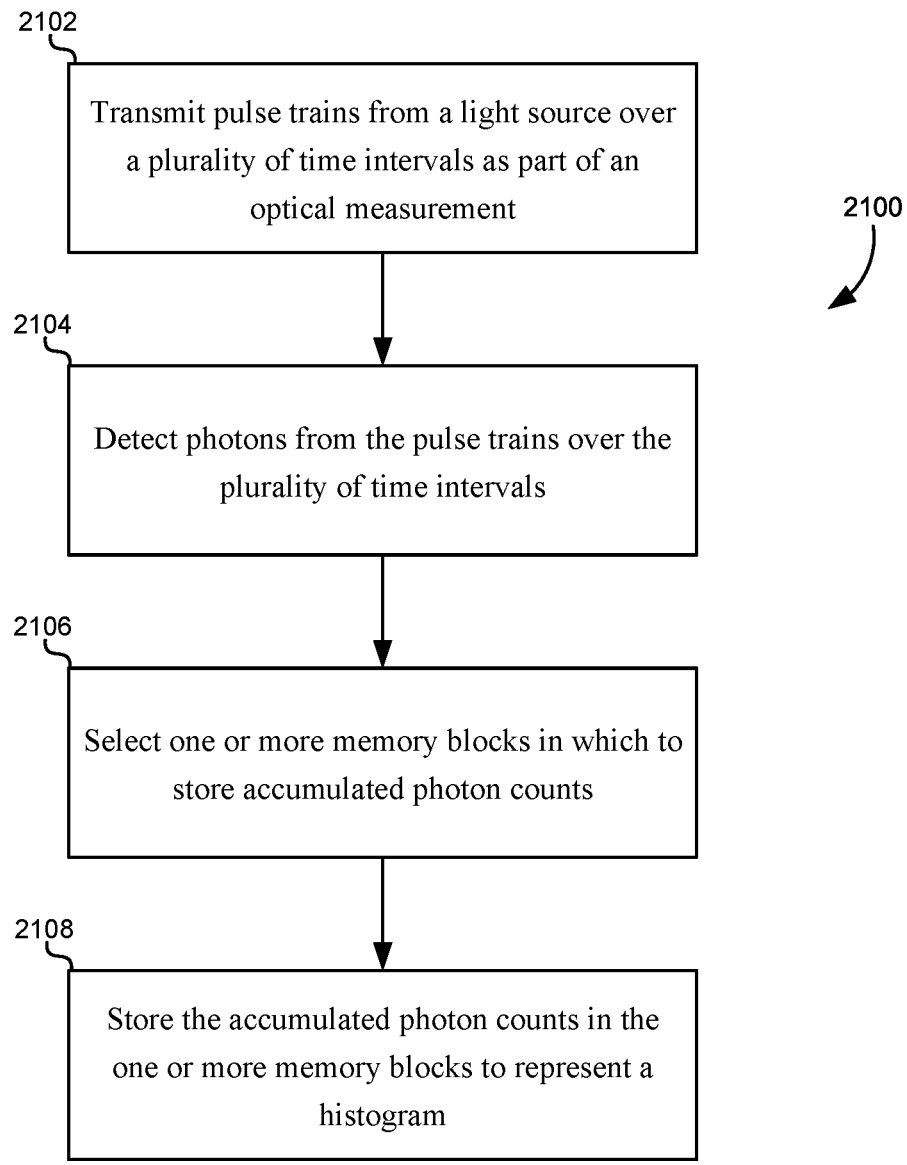
FIG. 21 illustrates a flowchart of a method for using an optical measurement system to store outputs from a single photosensor in one or more memory blocks.

FIG. 21 illustrates a flowchart 2100 of a method for using an optical measurement system to store outputs from a single photosensor in one or more memory blocks. As described above, this method may allow an optical measurement system to dynamically route signals from the photosensor to one or more memory blocks, depending on the selected configuration. Examples of different configurations that may be selected are illustrated above in FIGS. 18-19B. This method allows the optical measurement system to take a histogram data path with a single photosensor writing to a single memory block and reroute the photosensor output such that the single photosensor writes to memory blocks in other histogram data paths. This may cause the photosensors in those other data paths being turned off or otherwise left idle as their memory blocks are used by this photosensor. The method below describes a process for a single photosensor in the optical measurement system. However, as described above, the optical measurement system may include many photosensors, and this method may be carried out for each photosensor in the optical measurement system.

At step 2102, the method may include transmitting one or more pulse trains from a light source over one or more first time intervals as a part of an optical measurement. Each of the one or more first time intervals may represent a "shot" that is repeated multiple times in the measurement. Each of the first time intervals may include one or more pulse trains that are encoded and transmitted by the light sources such that the pulse trains can be recognized as they are reflected off of objects in the surrounding environment. Each of the time intervals may be subdivided into a plurality of time bins such that each of the time bins represents a bin in a histogram of received photon counts during the optical measurement. An example of how a single measurement may include multiple shots subdivided into time bins that aggregate photon counts is described above in relation to FIG. 9.

At step 2104, the method may also include detecting photons from the one or more pulse trains using a photosensor. As described in detail above, the photosensor may include a plurality of photodetectors, such as a plurality of SPADs. The photosensor may receive reflected light as well as ambient background noise received from the surrounding environment. The photosensor may also be coupled to threshold detection circuitry and/or arithmetic logic circuitry that accumulates photon counts. This combination may be referred to above as a "pixel." FIG. 5 illustrates an example of how photon counts may be received from photosensors and counted using threshold circuitry and pixel counters (e.g., arithmetic logic circuits).

At step 2106, the method may also include selecting one or more memory blocks from a plurality of memory blocks in which to store accumulated photon counts from the photosensor. In some embodiments, a select signal may be provided that causes one or more multiplexers to route the accumulated photon counts from the photosensor to the one or more memory blocks. Selecting more than one memory block to share a single pixel may cause other pixels in the optical measurement system to remain idle. Using the select signal, the one or more memory blocks may include a single memory block, two memory blocks, three memory blocks, four or more memory blocks, and so forth. Selecting more than one memory block may cause a clock signal used to accumulate photon counts to be increased. Memory blocks may be selected using, for example, any of the techniques described above in relation to FIG. 16 and FIG. 20.

At step 2108, the method may additionally include accumulating photon counts from the photosensor received during the one or more time intervals into the one or more memory blocks. In some embodiments, the accumulated photon counts may first be stored in memory buffers for each of the one or more memory blocks that have the same widths as a read/write ports on the one or more memory blocks. Each memory buffer may be subdivided into one or more sections, or individual registers or subdivisions representing time bins that can be sequentially filled by the photosensor. Each memory buffer may store accumulated photon counts from the photosensor over multiple time bins, and the photosensor may fill a section or subdivision in the memory buffer for each time bin. Each memory buffer may store its contents in its associated memory block when the buffer is full. Each memory block may include a plurality of registers, and each of the registers may correspond to the photosensor and a single time bin such that the contents of the one or more memory blocks combine to represent a histogram for the photosensor. In some embodiments, sharing the photosensor between multiple memory blocks may cause the number of time bins in the histogram represented by the memory blocks to be increased. Examples of how the photosensor can fill each of the buffers and/or memory blocks is described in detail above in FIGS. 18-19B.

It should be appreciated that the specific steps illustrated in FIG. 21 provide particular methods of using optical measurement system according to various embodiments. Other sequences of steps may also be performed according to alternative embodiments. For example, alternative embodiments of the present invention may perform the steps outlined above in a different order. Moreover, the individual steps illustrated in FIG. 21 may include multiple sub-steps that may be performed in various sequences as appropriate to the individual step. Furthermore, additional steps may be added or removed depending on the particular applications. One of ordinary skill in the art would recognize many variations, modifications, and alternatives.

XII. Flexible Channel Configurations

The embodiments described above illustrate how time bins for a single pixel can be spread out over multiple memory blocks. These embodiments also illustrate how a single memory block can be spread out over multiple pixels. The select circuits in FIG. 15 and FIG. 20 illustrate how the outputs from each pixel can be routed through a series of multiplexers to determine which pixels write to which memory blocks using one or more select signals. These various embodiments can be used to increase the clock frequency of the pixel, decrease or increase the number of memory blocks required by the optical measurement system, and increase the temporal resolution of each pixel.

FIGS. 22A-22D illustrate configurations where pixels and memory blocks can be freely connected through select circuits, according to some embodiments. Although the single-pixel, multiple-memory-block embodiments were discussed separately from the multiple-pixel, single-memory-block embodiments above, these features need not be implemented separately. Instead, an optical measurement system may include multiplexers from the select circuits in FIG. 15 and FIG. 20 such that pixel outputs can be freely routed among multiple neighboring memory blocks without restriction.

FIGS. 22A-22D illustrate different configurations for an optical measurement system that may be chosen using the select circuits described above. These figures are meant to illustrate how pixels can share memory blocks and vice versa. Therefore, the buffers and multiplexers in the select circuits described above have been omitted for clarity, but the operation of the select circuits should be evident by the changing connections illustrated in each configuration. The default configuration for the optical measurement system may be a single pixel routed to a single memory block, and the operation of the select circuits may be used to change this configuration during operation. In this example, the default configuration would route outputs from pixel 1110 to memory block 1104, outputs from pixel 1210 to memory block 1804, outputs from pixel 1220 to memory block 1904, and outputs from pixel 1410 to memory block 1908.

Figure 22A:
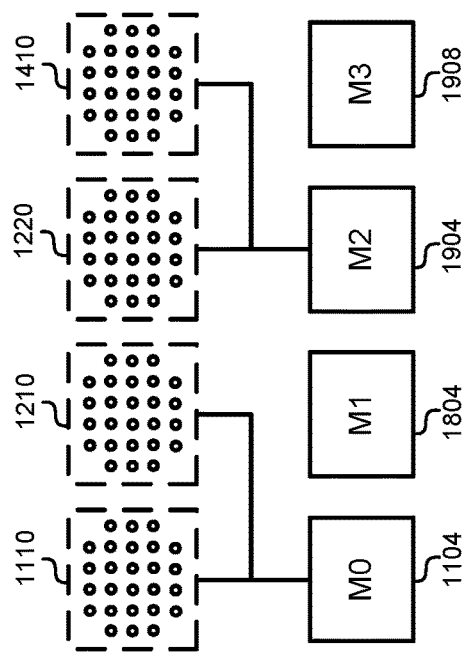
FIGS. 22A-22D illustrate configurations where pixels and memory blocks can be freely connected through select circuits, according to some embodiments.

FIG. 22A illustrates a configuration where outputs from two neighboring pixels have been routed to a single memory block. Specifically, the outputs from pixels 1110, 1210 have been routed to memory block 1104. The outputs from pixels 1220, 1410 have been routed to memory block 1904. Memory blocks 1804, 1908 may be idle to conserve power. As described above, each of the pixels 1110, 1210, 1220, 1410 may be clocked at twice the speed of the memory blocks 1104, 1804, 1904, 1908. Some embodiments may also use this as a double-channel configuration. For example, instead of allowing memory blocks 1804, 1908 to remain idle, some embodiments may include extra pixels that can be turned on when needed. For example, a default 256 channel optical measurement system may include extra pixels (e.g., 512 pixels total), and these pixels can be turned on or off using the select signals. This allows the optical measurement system to flexibly activate more channels without adding extra memory blocks because the additional pixels can share the memory blocks with the existing pixels.

Figure 22B:
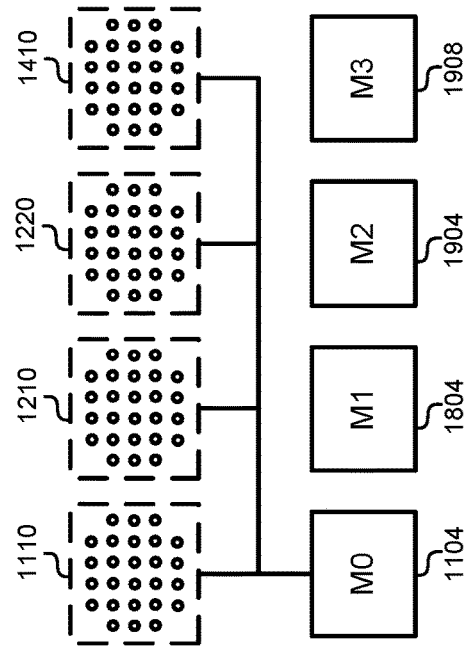

FIG. 22B illustrates a configuration where outputs from four neighboring pixels are routed to a single memory block. Specifically, the outputs from pixels 1110, 1210, 2020, 1410 may all be routed to memory block 1104. Memory blocks 1804, 1904, 1908 may remain idle. As described above, each of the pixels 1110, 1210, 1220, 1410 may be clocked at the same speed as memory block 1104. As was the case in FIG. 22A, this configuration may be used as a quad-channel configuration where the number of channels on the optical measurement system can be quadrupled by activating additional pixels beyond a default number of pixels. For example, for each default pixel, three additional pixels may be available that can be selectively turned on and routed to the shared memory block 1104.

Figure 22C:
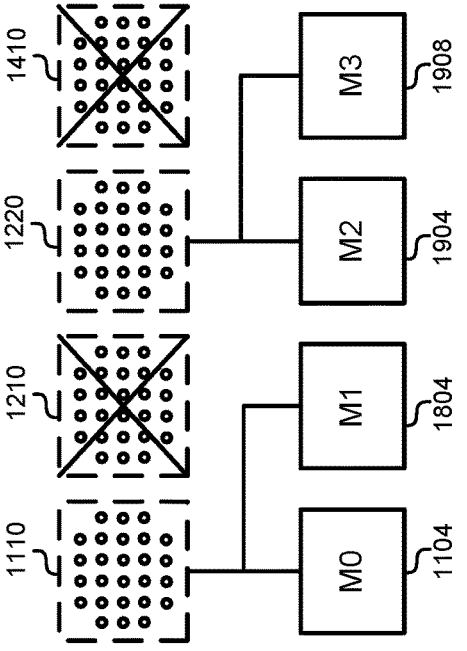

FIG. 22C illustrates a half-channel configuration where single pixels are routed to two memory blocks, according to some embodiments. Specifically, the output from pixel 1110 may be routed to memory blocks 1104, 1804, and the output from pixel 2020 may be routed to memory blocks 1904, 1908. Pixels 1210, 1410 may be turned off such that the number of pixel channels in the optical measurement system is reduced by half. Pixels 1110, 1220 may be clocked at twice the frequency as memory blocks 1104, 1804, 1904, 1908.

Figure 22D:
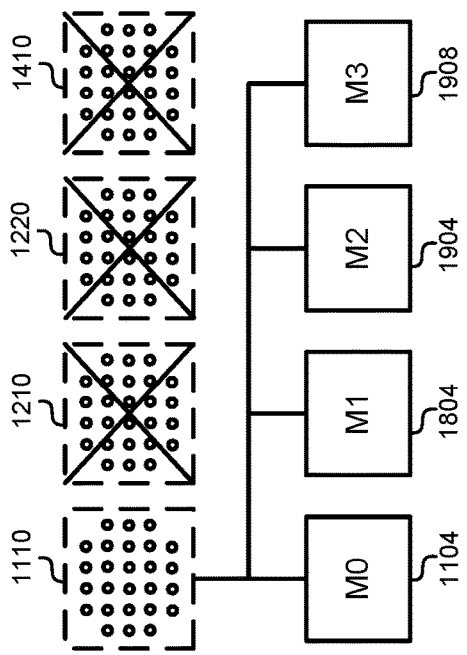

FIG. 22D illustrates a quarter-channel configuration where single pixels are routed to four memory blocks, according to some embodiments. Specifically the output from pixel 1110 may be routed to memory blocks 1104, 1804, 1904, 1908. Pixels 1210, 1220, 1410 may remain idle. Pixel 1110 may be clocked at four times the frequency of memory blocks 1104, 1804, 1904, 1908.

It should be emphasized that an optical measurement system may transition between any of the configurations illustrated in FIGS. 22A-22D using the select signals. As described above, the select signals may be implemented when the optical measurement system is designed and/or manufactured. Alternatively or additionally, the select signals may be provided at runtime when the optical measurement system is in operation. For example, by adjusting the select signals using an off chip processor, the optical measurement system may transition between the configuration of FIG. 22A to the configuration of FIG. 22D without restriction.

XIII. Additional Embodiments

While some embodiments disclosed herein have focused on the application of light ranging within the context of 3D sensing for automotive use cases, systems disclosed herein can be used in any application without departing from the scope of the present disclosure. For example, systems can have a small, or even miniature, form factors that enable a number of additional use cases, e.g., for solid-state light ranging systems. For example, systems can be used in 3D cameras and/or depth sensors within devices, such as mobile phones, tablet PCs, laptops, desktop PCs, or within other peripherals and/or user-interface devices. For example, one or more embodiments could be employed within a mobile device to support facial recognition and facial tracking capabilities, eye tracking capabilities, and/or for 3D scanning of objects. Other use cases include forward-facing depth cameras for augmented and virtual reality applications in mobile devices.

Other applications include deployment of one or more systems on airborne vehicles, such as airplanes, helicopters, drones, and the like. Such examples could provide 3D sensing and depth imaging to assist with navigation (autonomous or otherwise) and/or to generate 3D maps for later analysis, e.g., to support geophysical, architectural, and/or archeological analyses.

Systems can also be mounted to stationary objects and structures, such as buildings, walls, poles, bridges, scaffolding, and the like. In such cases, the systems can be used to monitor outdoor areas, such as manufacturing facilities, assembly lines, industrial facilities, construction sites, excavation sites, roadways, railways, bridges, etc. Furthermore, systems can be mounted indoors and used to monitor movement of persons and or objects within a building, such as the movement of inventory within a warehouse or the movement of people, luggage, or goods within an office building, airport, train station, etc. As would be appreciated by one of ordinary skill in the art with the benefit of this disclosure, many different applications of light ranging systems are possible and, as such, the examples provided herein are provided for illustrative purposes only and shall not be construed to limit the uses of such systems to only the examples explicitly disclosed.

XIV. Computer System

Any of the computer systems or circuits mentioned herein may utilize any suitable number of subsystems. The subsystems can be connected via a system bus 75. As examples, subsystems can include input/output (I/O) devices, system memory, storage device(s), and network adapter(s) (e.g. Ethernet, Wi-Fi, etc.), which can be used to connect a computer system other devices (e.g., an engine control unit). System memory and/or storage device(s) may embody a computer readable medium.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. An optical measurement system comprising:
   a light source configured to transmit one or more pulse trains over one or more time intervals as part of an optical measurement, wherein each of the one or more time intervals includes one of the one or more pulse trains, and wherein each of the one or more time intervals is subdivided into a plurality of time bins;
   a photosensor configured to detect photons from the light source;
   one or more memory blocks, wherein each of the one or more memory blocks comprises a plurality of registers configured to store accumulated photon counts from the photosensor, and wherein each of the plurality of registers is associated with a corresponding one of the plurality of time bins to represent a histogram; and
   a select circuit configured to:
   receive accumulated photon counts from the photosensor during the one or more time intervals;
   provide a select signal that adds or removes memory blocks from the one or more memory blocks that accumulate photon counts from the photosensor; and
   change a clock signal associated with the photosensor in response to the adding or removing of memory blocks from the one or more memory blocks.

2. The optical measurement system of claim 1, further comprising one or more buffers coupled to the select circuit and the one or more memory blocks and configured to receive the accumulated photon counts from the photosensor.

3. The optical measurement system of claim 2, wherein the one or more buffers are configured to receive the accumulated photon counts incrementally from the photosensor as they are provided by the photosensor.

4. The optical measurement system of claim 2, wherein the one or more buffers are configured to provide the accumulated photon counts to the one or more memory blocks when each of the one or more buffers are filled.

5. The optical measurement system of claim 2, wherein each of the one or more buffers are divided into a plurality of sections.

6. The optical measurement system of claim 5, wherein each of the plurality of sections are populated with accumulated photon counts from different time bins in the plurality of time bins.

7. The optical measurement system of claim 5, wherein each of the plurality of sections are populated with accumulated photon counts from the photosensor.

8. The optical measurement system of claim 2, wherein a bit-width of a memory block is the same as a bit-width of a buffer.

9. The optical measurement system of claim 1, wherein the select circuit comprises a plurality of multiplexers that route outputs from the photosensor to the one or more memory blocks.

10. The optical measurement system of claim 1, further comprising a clock multiplier that increases a frequency of a clock used for the photosensor.

11. A method of using an optical measurement system, the method comprising:
    transmitting one or more pulse trains from a light source over one or more time intervals as part of an optical measurement, wherein each of the one or more time intervals includes one of the one or more pulse trains, and wherein each of the one or more time intervals is subdivided into a plurality of time bins;
    detecting photons from the one or more pulse trains using a photosensor;
    selecting one or more memory blocks from a plurality of memory blocks to store accumulated photon counts from the photosensor; and
    accumulating photon counts from the photosensor received during the one or more time intervals into the one or more memory blocks, wherein each of the one or more memory blocks comprises a plurality of registers, and each of the plurality of registers is associated with a corresponding one of the plurality of time bins for the photosensors to represent a histogram;
    changing the number of memory blocks in the one or more memory blocks; and
    changing a clock signal associated with the photosensor based on the changed number of memory blocks in the one or more memory blocks.

12. The method of claim 11, wherein selecting the one or more memory blocks from the plurality of memory blocks comprises:
    receiving a signal from an on-chip processor.

13. The method of claim 11, wherein selecting the one or more memory blocks from the plurality of memory blocks comprises:
    receiving a signal from an off-chip processor as the optical measurement system is operating.

14. The method of claim 11, wherein increasing the number of memory blocks in the one or more memory blocks increases a frequency of the clock signal associated with the photosensor.

15. The method of claim 11, wherein decreasing the number of memory blocks in the one or more memory blocks decreases a frequency of the clock signal associated with the photosensor.

16. The method of claim 11, further comprising causing one or more photosensors to remain idle, wherein the one or more photosensors are associated with the one or more memory blocks.

17. The method of claim 11, wherein clock signals associated with the one or more memory blocks are phase-shifted 90° relative to each other.

18. The method of claim 11, wherein clock signals associated with the one or more memory blocks are phase-shifted 180° relative to each other.

19. A method of using an optical measurement system, the method comprising:
    transmitting one or more pulse trains from a light source over one or more time intervals as part of an optical measurement, wherein each of the one or more time intervals includes one of the one or more pulse trains, and wherein each of the one or more time intervals is subdivided into a plurality of time bins;

detecting photons from the one or more pulse trains using a photosensor;

selecting one or more memory blocks from a plurality of memory blocks to store accumulated photon counts from the photosensor; and accumulating photon counts from the photosensor received during the one or more time intervals into the one or more memory blocks, wherein each of the one or more memory blocks comprises a plurality of registers, and each of the plurality of registers is associated with a corresponding one of the plurality of time bins for the photosensors to represent a histogram;

receiving a select signal that adds or removes memory blocks from the one or more memory blocks that accumulate photon counts from the photosensor; and changing a clock signal associated with the photosensor in response to the adding or removing of memory blocks from the one or more memory blocks.

\* \* \* \* \*